United States Patent
Kondo et al.

(10) Patent No.: US 6,463,178 B1
(45) Date of Patent: Oct. 8, 2002

(54) IMAGE PROCESSING DEVICE AND METHOD, AND TRANSMISSION MEDIUM, TRANSMISSION METHOD AND IMAGE FORMAT

(75) Inventors: Tetsujiro Kondo; Tomonori Okuwaki, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/242,348

(22) PCT Filed: Jun. 16, 1998

(86) PCT No.: PCT/JP98/02646
§ 371 (c)(1),
(2), (4) Date: Feb. 12, 1999

(87) PCT Pub. No.: WO98/58497
PCT Pub. Date: Dec. 23, 1998

(30) Foreign Application Priority Data

Jun. 16, 1997 (JP) ............................................. 9-158318

(51) Int. Cl.[7] .................................................. G06K 9/36
(52) U.S. Cl. ......................... 382/232; 382/238; 382/256; 348/458; 348/556
(58) Field of Search ................................ 382/232, 256, 382/238, 199, 125; 348/458, 556; 386/112

(56) References Cited

U.S. PATENT DOCUMENTS

| 5,335,298 | A | * | 8/1994 | Hevenor et al. ............ 382/199 |
| 5,365,276 | A | * | 11/1994 | Imai et al. .................. 348/556 |
| 5,517,245 | A | * | 5/1996 | Kondo et al. ............... 348/392 |
| 5,684,933 | A | * | 11/1997 | Nagafusa .................... 358/1.9 |
| 5,901,239 | A | * | 5/1999 | Kamei ........................ 382/125 |
| 5,905,846 | A | * | 5/1999 | Tsuneda et al. ............. 386/112 |
| 5,912,708 | A | | 6/1999 | Kondo et al. ............... 348/415 |
| 5,940,132 | A | | 8/1999 | Kondo et al. ............... 348/441 |
| 5,946,044 | A | * | 8/1999 | Kondo et al. ............... 348/458 |
| 6,008,790 | A | * | 12/1999 | Shingu et al. .............. 345/116 |

FOREIGN PATENT DOCUMENTS

| JP | 7-46589 | 2/1995 | ............ H04N/7/24 |
| JP | 7-212752 | 8/1995 | ............ H04N/7/24 |
| JP | 7-240903 | 9/1995 | .......... H04N/7/015 |

* cited by examiner

Primary Examiner—David Moore
Assistant Examiner—Anh Hong Do
(74) Attorney, Agent, or Firm—Frommer Lawrence & Haug LLP; William S. Frommer; Gordon Kessler

(57) ABSTRACT

Disclosed is an image processing apparatus 10D for processing image data that composes a dynamic image, wherein pixels are thinned for each frame with respect to the pixels of the respective frames that compose a dynamic image, in such a manner that they become the chessboard-like lattice format in both directions of the spatial direction and the temporal direction, so that the quantity of information can be reduced, maintaining the resolutions of horizontal, vertical and oblique directions of the dynamic image.

10 Claims, 19 Drawing Sheets

ODD-NUMBERED FRAME

EVEN-NUMBERED FRAME

CLUSTERING

ADRC PROCESSING

IMAGE PROCESSING DEVICE AND METHOD, AND TRANSMISSION MEDIUM, TRANSMISSION METHOD AND IMAGE FORMAT

FIELD OF THE INVENTION

This invention is directed to an image processing apparatus, an image processing method, a transmission medium, a transmitting method and an image format, and especially directed to an image processing apparatus, an image processing method, a transmission medium, a transmitting method and an image format which make it possible to alleviate the deterioration of image quality of a dynamic image.

DESCRIPTION OF THE RELATED ART

Heretofore, interlace scanning is known as a scanning method for displaying a dynamic image.

That is, for instance, in the case where an image is shot by means of a video camera, etc., in essence, it is ideal, in terms of the image quality and the resolution, to compose each frame with pixels having the same arrangement as the pixels (represented by ○ marks, in FIG. 1) of the built-in photoelectric conversion element such as a CCD (charge coupled device) as shown in FIG. 1, and to perform transmission and recording of it.

However, this requires that large amount of information is transmitted and recorded. So, in order to lessen the amount of information, image is composed in such a manner that the first picture frame (the first field, in the case of interlace scanning) is comprised of only the pixels (represented by ○ marks, in the same figure) of the even-numbered lines, negating the pixels (represented by ● marks, in the same figure) of the odd-numbered lines, and the next picture frame is comprised of only the pixels (represented by ● marks, in the same figure) of the odd-numbered lines, negating the pixels (represented by ○ marks, in the same figure) of the even-numbered lines, and the succeeding picture frame is composed in the same way as the first picture frame; and these process are repeated in the following, as shown in FIG. 2.

For convenience, such a thinning method is referred to as interlace thinning, since interlace scanning can be considered to be one of methods for thinning the pixels for the purpose of reduction of the amount of information as known from the above.

By the way, the resolution of image in the vertical direction is depends on the number of the lines. Therefore, when interlace thinning has been performed, the vertical resolution of the thinned image becomes to ½ of the vertical resolution of the image that is not yet subjected to thinning out. As a result of this, it becomes difficult to represent fast changes of the image in vertical direction, and so there is a problem that if such fast movements exist, the image quality is deteriorated.

SUMMARY OF THE INVENTION

Considering such an aspect, the present invention provides an image processing apparatus, an image processing method, a transmission medium, a record medium, and an image format which are able to alleviate the deterioration of the image quality that emerges from thinning out.

The image processing apparatus and method of the present invention for processing an image data that composes a dynamic image is characterized by thinning the picture elements (pixels) of the respective frames that compose the dynamic image, in such a manner that they become a chessboard-like lattice format in both directions of the spatial direction and the temporal direction, thereby producing a thinned image data, and then outputting the thinned image data. Besides, the image processing apparatus and method of the present invention is further characterized by performing bit-thinning of the direction of the level of each pixel that composes the thinned image data, thereby producing a modified thinned image data, and then outputting the modified thinned image data.

The transmitting method and the transmission medium of the present invention for transmitting the data that has been produced by thinning the pixels of the image data that composes a dynamic image is characterized by thinning the pixels of the respective frames that compose the dynamic image, in such a manner that they become a chessboard-like lattice format in both directions of the spatial direction and the temporal direction, thereby producing a thinned image data, and then transmitting the thinned image data. Besides, the transmitting method and the transmission medium of the present invention is further characterized by performing bit-thinning of the direction of the level of each of the pixels that compose the thinned image data, thereby producing a modified thinned image data, and then transmitting the modified thinned image data as the transmission data.

The image format of composing a dynamic image according to the present invention is characterized by that the pixels of the respective frames composing a dynamic image have been thinned, in such a manner that they have become a chessboard-like lattice format in both directions of the spatial direction and the temporal direction. Furthermore, the image format according to the present invention is characterized by that bit-thinning of the direction of the level of each pixel is performed, with respect to the pixels of the data of which thinning have been performed for each frame.

The image processing apparatus according to the present invention for processing the thinned data that has been produced by thinning the pixels of the image data composing a dynamic image comprises: a receiving means for receiving the thinned image data that has been produced by thinning the pixels of the respective frames that compose the dynamic image, in such a manner that they become a chessboard-like lattice format in both directions of the spatial direction and the temporal direction; and a restoring means for producing the negated pixels, with respect to the thinned image data, and for restoring the original image data.

Besides, the image processing apparatus according to the present invention is characterized by that the restoring means is comprised of a determining means for determining a stated class that represents the property of the attentional negated pixel of the thinned image data, and a generating means for predicting the original pixel in response to the determined class and for generating the original pixel data.

Besides, the image processing apparatus according to the present invention is characterized by that the generating means includes a memory for storing a predictive data, for each class, that has been previously produced for each class on the basis of learning by the use of the image data that composes a dynamic image in a standard manner, reads out a predictive data that corresponds to said determined class, and generates the original pixel data on the basis of the predictive data that has been read out.

The image processing apparatus according to the present invention for processing the thinned data that has been produced by thinning the pixels of the image data composing a dynamic image comprises: a receiving means for receiving the modified thinned image data that has been obtained by further performing bit-thinning of the direction of the level of the pixel, toward each pixel of the thinned image data that has been produced by thinning the pixels of the respective frames that compose the dynamic image for each frame, in such a manner that they become a chessboard-like lattice format in both directions of the spatial direction and the temporal direction; and a restoring means for producing the original pixel with respect to each bit-thinned pixel of the modified thinned image data, thereby producing the thinned image data, and for restoring the original image data from the thinned pixels of the thinned image data.

Besides, the image processing apparatus according to the present invention is characterized by that the restoring means is comprised of a first determining means for determining a stated class that represents the property of the attentional bit-thinned pixel of the bit-thinned image data, a first generating means for predicting the original pixel in response to the determined class and thereby generating the original pixel data, a second determining means for determining a stated class that represents the property of the attentional negated pixel of the thinned image data that is composed of said pixel data generated by the first generating means, and a second generating means for predicting the original pixel in response to the determined class and for generating the original pixel data.

Besides, the image processing apparatus according to the present invention is characterized by that the first generating means includes a memory for storing a predictive data, for each class, that has been previously produced for each class on the basis of learning by the use of the image data that composes a dynamic image in a standard manner, reads out the predictive data that corresponds to the class that has been determined by said first determining means, and generates the original pixel data on the basis of the very predictive data that has been read out, and each of the second-generating means includes a memory for storing a predictive data, for each class, that has been previously produced for each class on the basis of learning by the use of the image data that composes a dynamic image in a standard manner, reads out the predictive data that corresponds to the class that has been determined by said second determining means, and generates the original pixel data on the basis of the very predictive data that has been read out.

DESCRIPTION OF THE PREFERRED EMBODIMENTS

Figure 1:
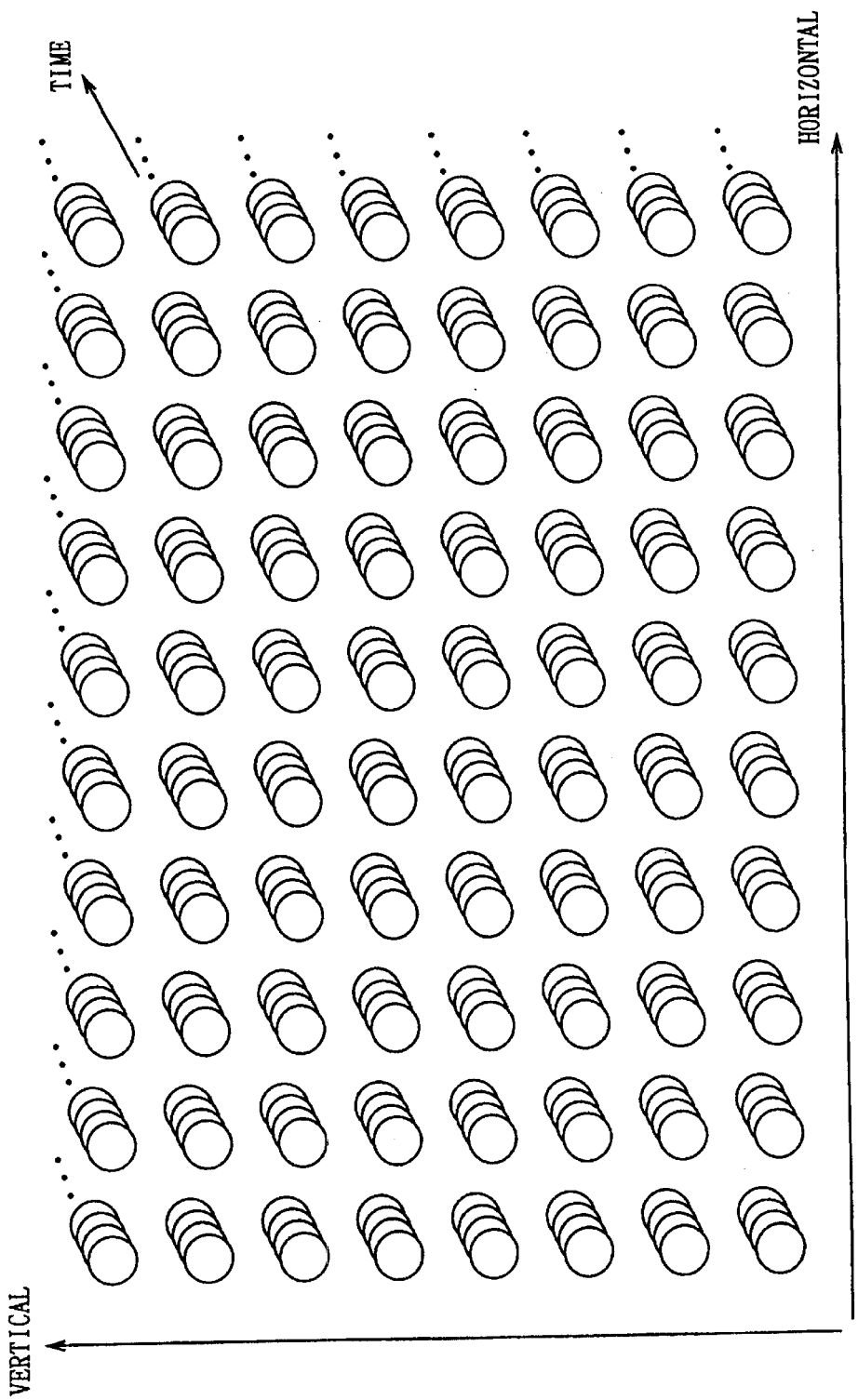
FIG. 1 is a diagram showing an image that has been not yet subjected to interlace thinning.
Figure 2:
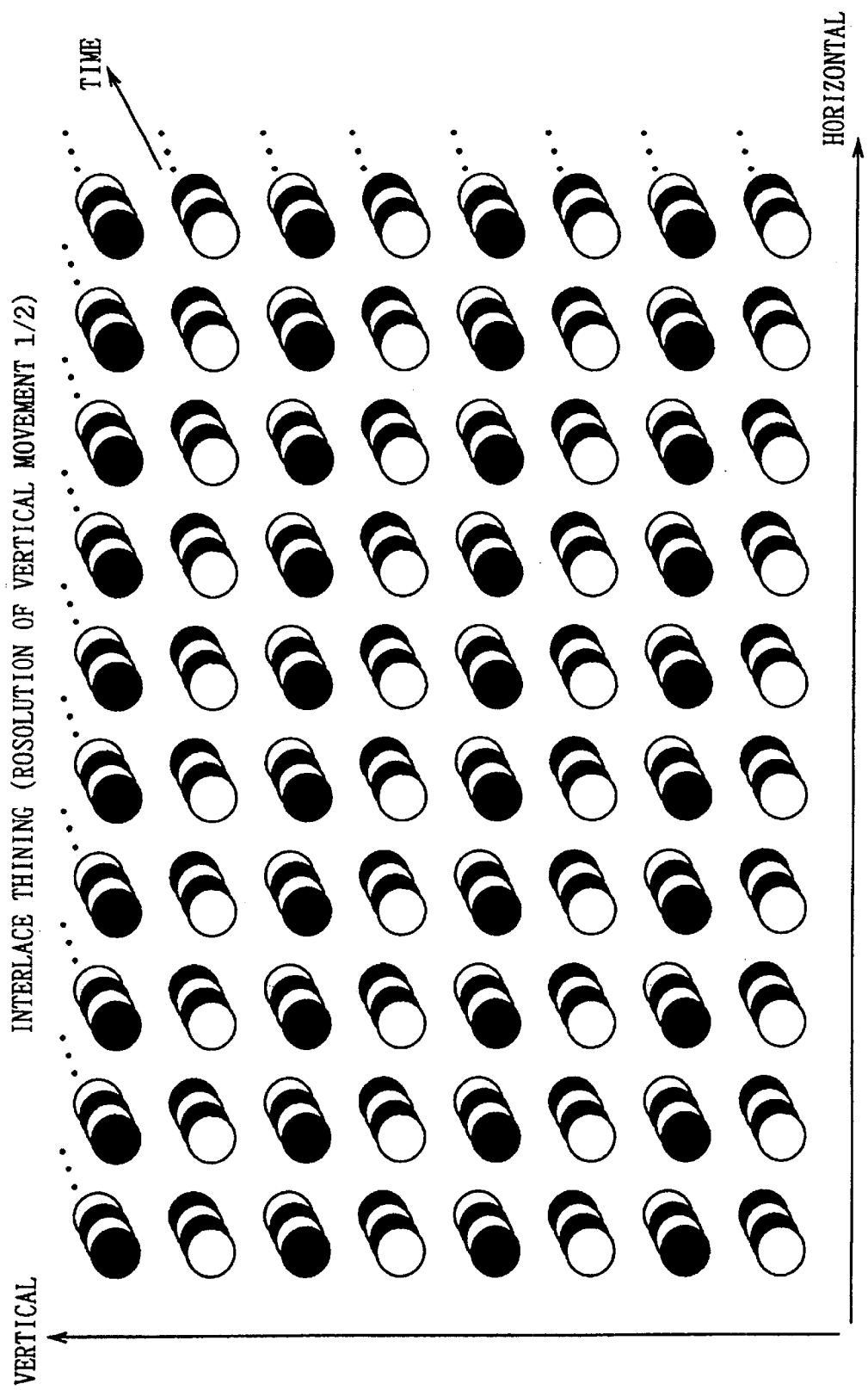
FIG. 2 is a diagram showing an image that has been subjected to interlace thinning.

Referring to the drawings, the embodiments of the present invention are hereinafter described in more detail.

Figure 3:
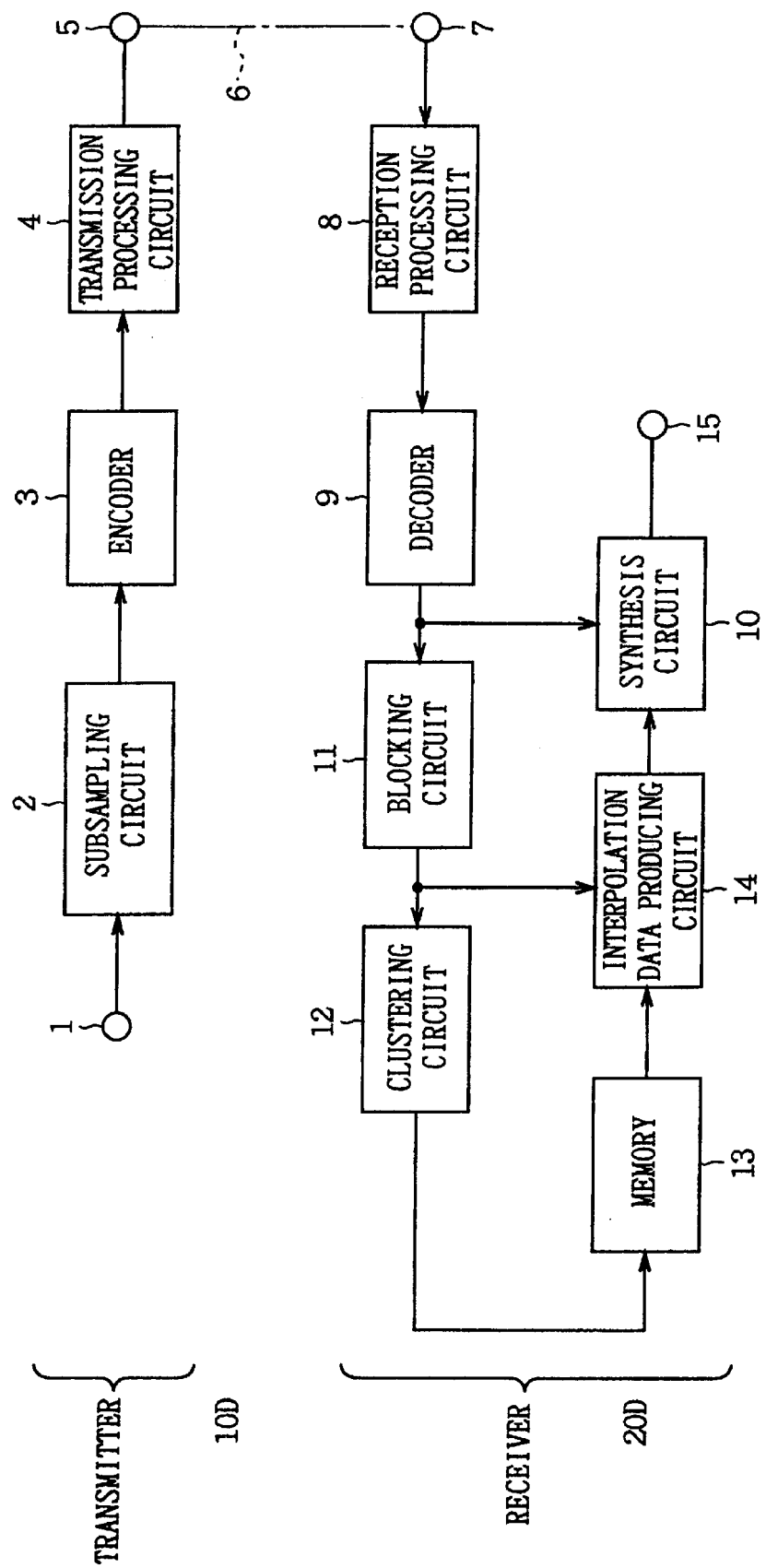
FIG. 3 is a block diagram showing a configuration of the first embodiment of a transmitting/receiving system to which the invention has been applied.

FIG. 3 shows a configuration of the first embodiment of a transmitting/receiving system to which the invention has been applied ("system" refers to plural devices that have been logically combined and that is not questioned whether the components exist within the identical housing).

This transmitting/receiving system is comprised of a transmitter 10D and a receiver 20D. The transmitter 10D is comprised of an input terminal 1, a subsampling circuit 2, an encoder 3, a transmission processing circuit 4 and an output terminal 5, and adapted to compress image data by thinning the pixels and to transmit it. While, the receiver 20D is comprised of an input terminal 7, a reception processing circuit 8, a decoder 9, a synthesis circuit 10, a blocking circuit 11, a clustering circuit 12, a memory 13, an interpolation circuit 14 and an output terminal 15, and adapted to expand the compressed image data from the transmitter 10D.

That is, the transmitter 10D is supplied with a digital image data of a dynamic image (which may be referred to as a whole-pixel dynamic image, hereinafter) wherein each of whose frame is comprised of pixels that have been shot with a video camera or the like (not shown) and that have the same arrangement as that of the pixels of an integrated optical-electric conversion element such as a CCD, for instance. In this connection, such a whole-pixel dynamic image can be obtained by a so-called progressive camera (a video camera that scans all pixels exist on a photoelectric conversion element in an order of so-called raster scanning, and outputs it as an image signal of 1 frame) or a whole-pixel camera (a video camera that outputs signals of all pixels exist on a photoelectric conversion element, at a time, as an image signal of 1 frame).

This digital image data is supplied to the subsampling circuit 2, via the input terminal 1. In the subsampling circuit 2, pixels of the respective frames that compose a dynamic image, that is a digital image data, are thinned and compressed in such a manner that they become the chessboard-like lattice format in both directions of the spatial direction and the temporal direction as shown in FIG. 4 as an example.

Figure 4:
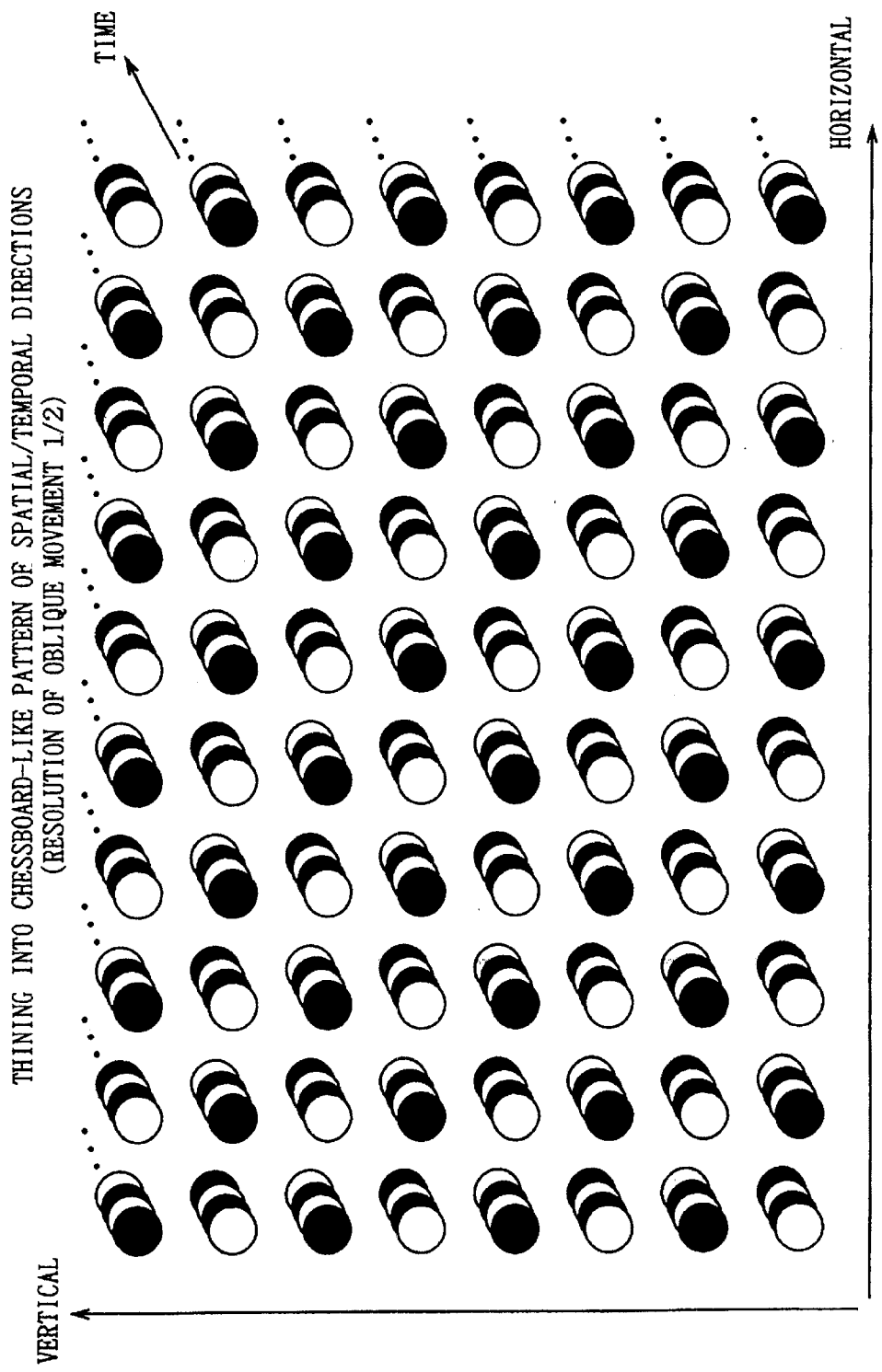
FIG. 4 is a diagram illustrating the processing of a subsampling circuit 2 of FIG. 3.

Both of ● marks and ○ marks are denoting pixels of frames that compose a whole-pixel dynamic image, in FIG. 4 (as well as the following FIG. 5, FIG. 6, FIG. 9 and FIG. 14). The ● marks are denoting the pixels that have been negated at the subsampling circuit 2 (these may be referred to as negated pixels (pixel data), hereinafter), while the ○ marks are denoting the pixels that are remaining after thinning has been performed by the subsampling circuit 2 (these may be referred to as thinned pixels (pixel data), hereinafter).

Figure 5A:
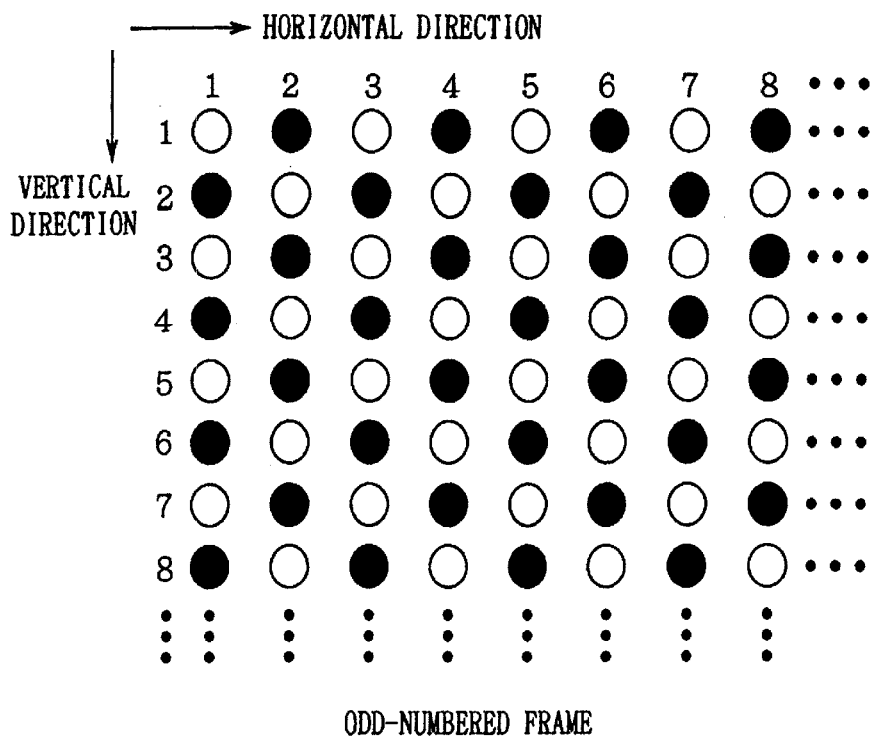
FIG. 5 is a diagram illustrating the processing of the subsampling circuit 2 of FIG. 3.
Figure 5B:
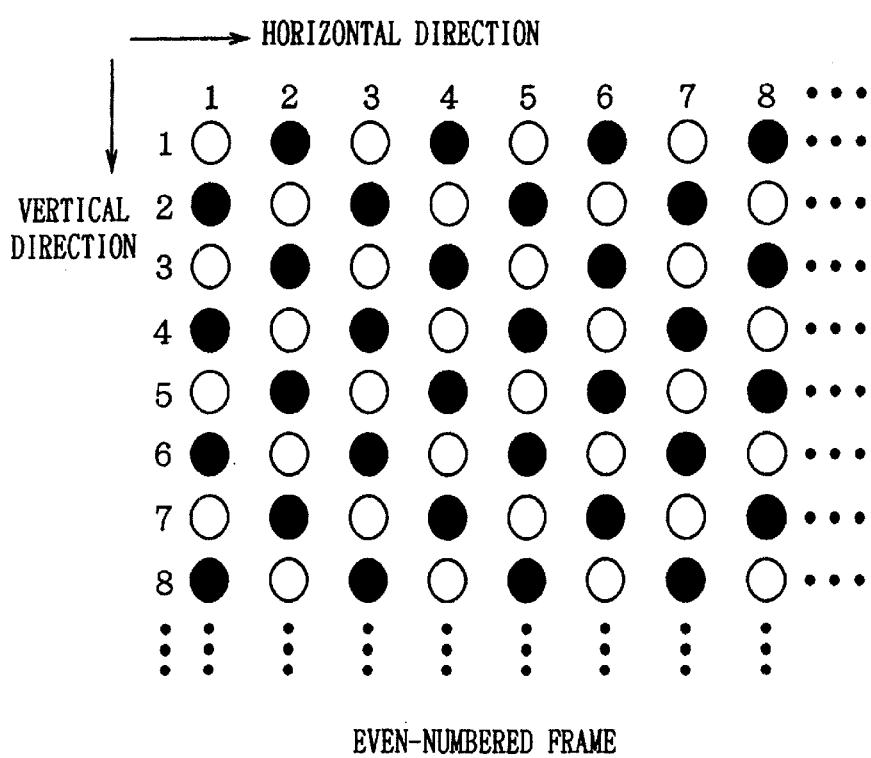

That is, in the subsampling circuit 2, with respect to the first frame, as shown in FIG. 5(A) as an example, the pixels of the second column, the fourth column, the sixth column, the eighth column, . . . of the first line, and the first column, the third column, the fifth column, the seventh column, . . . of the second line are negated (denoted by ● marks, in said figure (A)); similarly, with respect to the odd-numbered frames, thinning is performed in the spatial direction, in such a manner that the pixels become the chessboard-like lattice pattern. While, with respect to the second frame, as shown in FIG. 5(B) as an example, the pixels of the first column, the third column, the fifth column, the seventh column, . . . of the first line, and the second column, the fourth column, the sixth column, the eighth column, . . . of the second line are negated (denoted by ● marks, in said figure (B)); similarly, with respect to the even-numbered frames also, thinning is performed in the spatial direction, in such a manner that the pixels become the chessboard-like lattice pattern.

Figure 6:
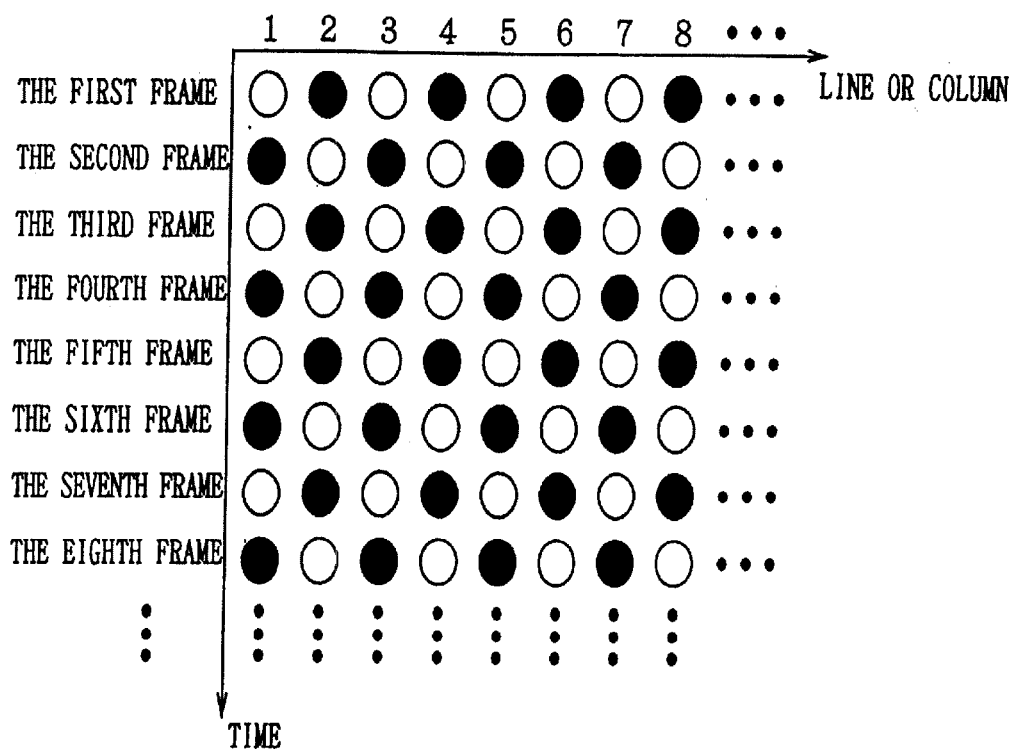
FIG. 6 is a diagram illustrating the processing of the subsampling circuit 2 of FIG. 3.

Besides, in this case, when the attention is given to a certain line or a certain column, as shown in FIG. 6 as an example, with respect to the first frame, the second, the fourth, the sixth, the eighth, . . . pixels that compose the very attentional line or column (denoted by ● marks, in said figure) are negated, and, with respect to the second frame, the first, the third, the fifth, the seventh, . . . pixels that compose the very attentional line or column (denoted by ● marks, in said figure) are negated. And, with respect to the third frame, the second, the fourth, the sixth, the eighth, . . . pixels that compose the very attentional line or column (denoted by ● marks, in said figure) are once more negated, and, thinning is performed for the succeeding frames in the same way; therefore, thinning in the temporal direction is also performed in the subsampling circuit 2, into the chessboard-like lattice pattern.

With respect to the respective frames of the whole-pixel dynamic image, thinning is performed into the chessboard-like lattice pattern in both directions of the spatial direction and the temporal direction (this may be referred to as spatial/temporal chessboard-like pattern thinning, hereinafter) as stated above, so that the alternate pixels are leaved in either direction of the spatial direction and the temporal direction. Therefore, the amount of the information that have been subjected to spatial/temporal chessboard-like pattern thinning becomes ½ of that of the quantity of the original information, for the most part, like the foregoing case where the interlace thinning has been performed.

Figure 7:
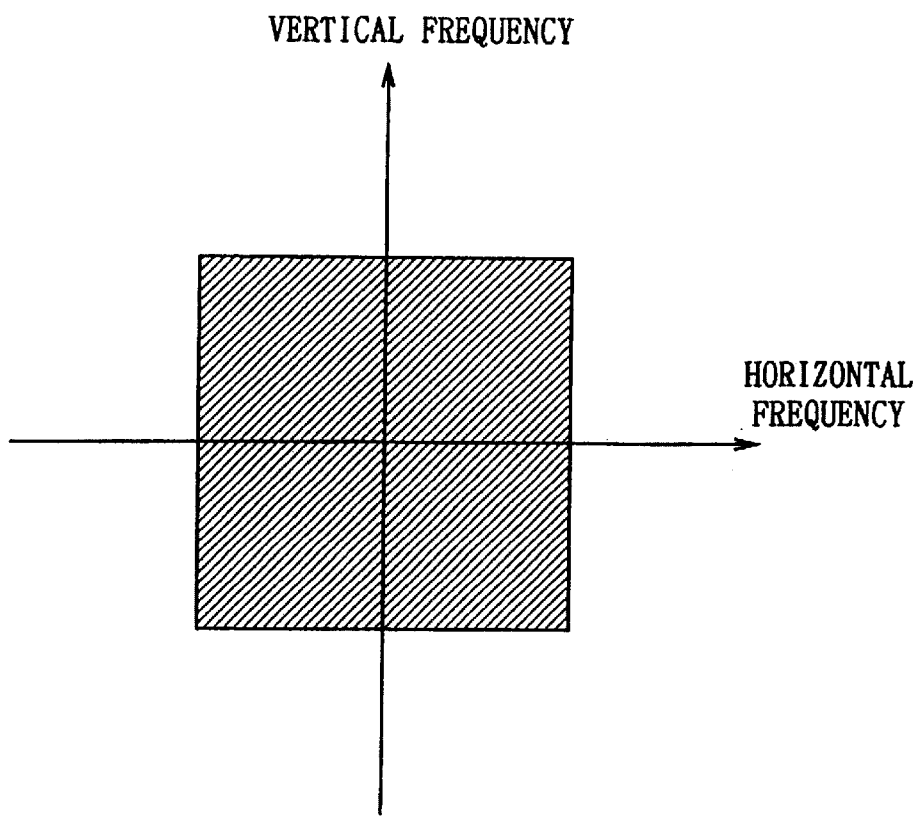
FIG. 7 is a diagram showing a spatial frequency band of an image that is outputted from the subsampling circuit 2 of FIG. 3.

FIG. 7 shows the spatial frequency band (the portion having slant lines in the figure) of an image that have been subjected to spatial/temporal chessboard-like pattern thinning. The spatial frequency band of the image that have been subjected to spatial/temporal chessboard-like pattern thinning becomes rectangular, as shown in the figure, as a result of it, the resolution of oblique direction is maintained to some extent, as well as the resolution of horizontal direction and vertical direction.

Figure 8:
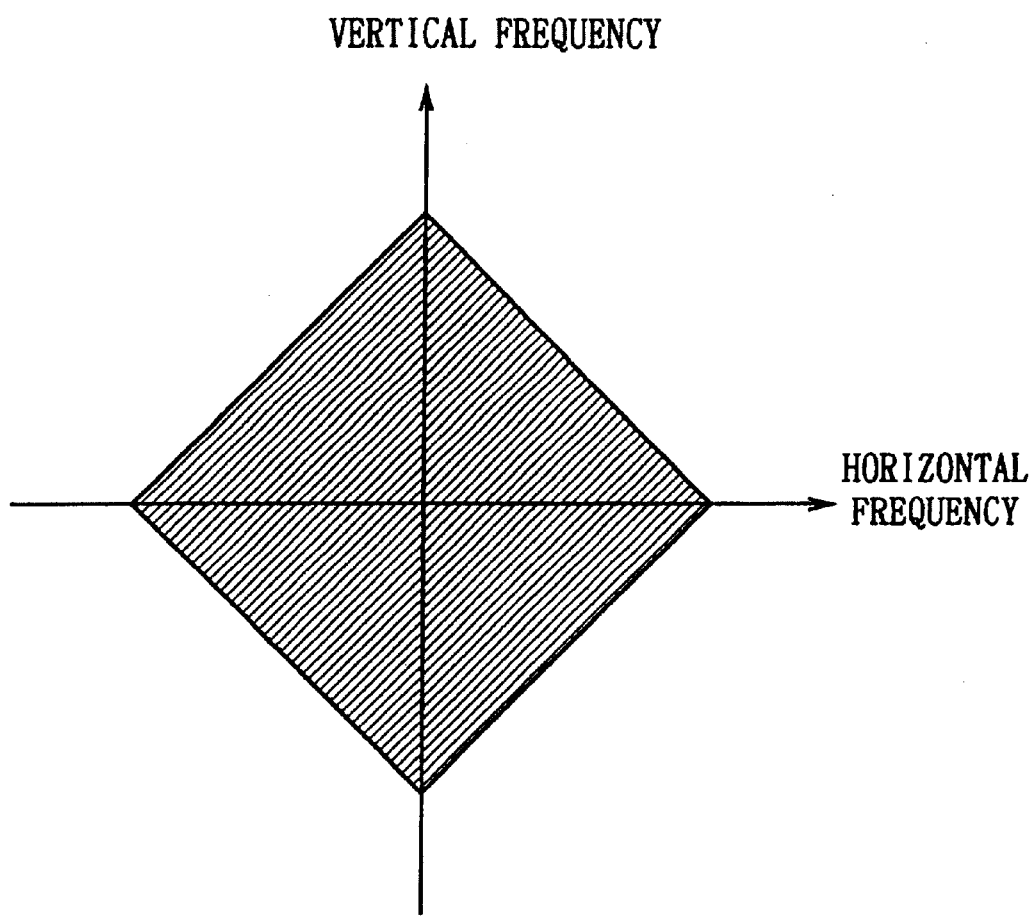
FIG. 8 is a diagram showing a spatial frequency band of an image that is obtained by performing simple chessboard-like pattern thinning.

In contrast, FIG. 8 shows the spatial frequency band (the portion having slant lines in the figure) of the image that have been subjected to chessboard-like lattice pattern thinning of only spatial direction (chessboard-like lattice pattern thinning in which pixels that are to be thinned out are the same between the adjacent frames). In this case, the spatial frequency band becomes rhombus; as a result of it, though the resolutions of horizontal and vertical directions are maintained to the original resolution, the resolution of oblique direction lowers to ½ of the original.

Therefore, by performing spatial/temporal chessboard-like pattern thinning, the amount of information can be lessen, and besides, every resolutions of horizontal, vertical and oblique directions can be maintained. As a result, it becomes possible to represent fast changes in all these directions, and it becomes possible to alleviate (prevent) deterioration of image quality of the case where such movements exist. However, when the attention is given to a certain frame, its resolution of oblique direction lowers even the case of spatial/temporal chessboard-like pattern thinning.

Returning to FIG. 3, the thinned image data that is comprised of the thinned pixels (pixel data) that have been subjected to spatial/temporal chessboard-like pattern thinning at the subsampling circuit 2 is supplied to the encoder 3. In the encoder 3, the data from the subsampling circuit 2 (the image data that is comprised of the thinned pixels (pixel data)) is subjected to high efficiency coding. As high efficiency coding methods, there are a hybrid system that uses orthogonal transformation such as DCT (discrete cosine transform) and motion compensation, a hybrid system that uses DCT and quantization, a system that uses ADRC (Adaptive Dynamic Range Coding), and others. Suggestions of ADRC are disclosed in U.S. Pat. No. 4,703,352 (Issued Date: Oct. 27, 1987) and others.

The coded data that is obtained by exposing the thinned image data to high efficiency coding in the encoder 3 is supplied to the transmission processing circuit 4. The transmission processing circuit 4 exposes the coded data, which has been delivered from the encoder 3, to required signal processings such as error correction, packet assembling, channel coding, and outputs the resulted transmission data via the output terminal 5. This transmission data is transmitted via a stated transmission line 6. The transmission line 6 can include communication circuits such as a satellite circuit, a ground wave, a CATV network, a public network and an internet, and besides, can include a magnetic recording/reproducing process, and recording media such as a magnetic disk, an optical disk, a magnetic tape and a magneto-optic disk.

The transmission data from the transmission line 6 is received by the reception processing circuit 8, via the input terminal 7 of the receiver 20D. In the reception processing circuit 8, the transmission data is subjected to the required signal processings such as channel decoding, packet disassembling and error correction; the coded data that is obtained as a result of it is supplied to the decoder 9. In the decoder 9, this coded data is decoded through the decoding process that corresponds to the coding process of the transmitter 10D, hereby it becomes the thinned image data that is comprised of the thinned pixels (pixel data), and then it is supplied to-the synthesis circuit 10 and the blocking circuit 11.

As shown in FIG. 11 for instance, the blocking circuit 11 groups four thinned pixels (pixel data) a, b, c and d that are neighboring the attentional negated pixel x for the stated position (the position that is to be interpolated) upwards, downwards, left and right respectively of the spatial direction into one block, so as to generate a class tap and a predictive tap, and then supplies the class-tap to the clustering circuit 12 and supplies the predictive tap to the interpolation circuit 14 respectively. Toward each negated pixel, the blocking circuit 11 composes a block that is comprised of the thinned pixels (pixel data) neighboring the negated pixel upwards, downwards, left and right of the spatial direction, and then supplies it to the clustering circuit 12 as a class tap, and to the interpolation data producing circuit 14 as a prediction tap, respectively. As used herein, the class tap and the prediction tap are the same one.

The clustering circuit 12 clusters the blocks that have been delivered from the blocking circuit 11 into the stated class, in accordance with the properties of the thinned pixels that are composing the blocks.

At here, a brief explanation is given to clustering.

Figure 10:
FIG. 10 is a diagram illustrating the processing of a clustering circuit 12 of FIG. 3.
Figure 10:
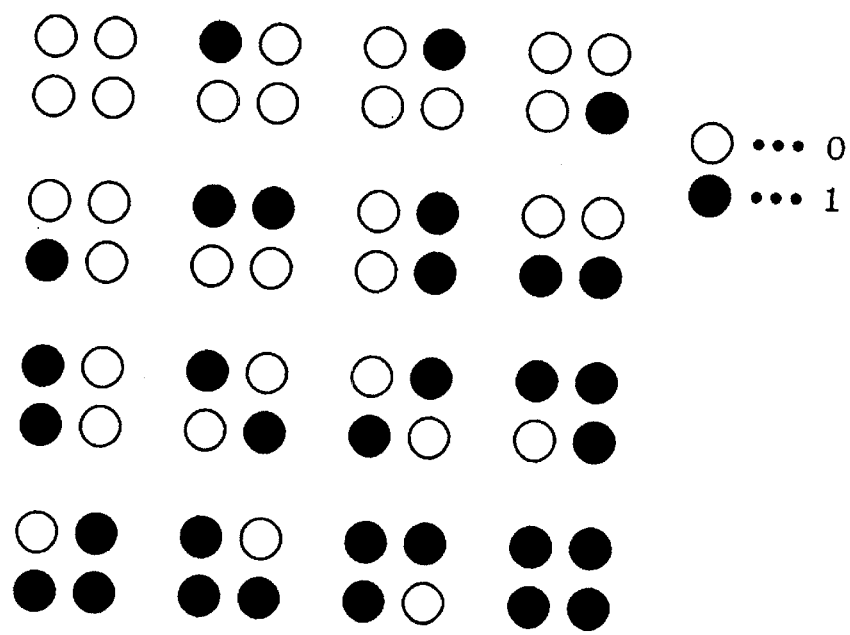

Supposing that a block (class tap) is comprised of 2×2 pixels as shown in FIG. 10(A) and each of the pixels can be represented by 1 bit (it takes either 0 level or 1 level); this block (class tap) of four pixels (2×2 pixels) can be classified into 16 (=$(2^1)^4$) patterns on the basis of the level distribution of the respective pixels, as shown in FIG. 10(B). Classification like this is referred to as clustering, and performed in the clustering circuit 12.

Usually, for instance 8 bits are allocated to each pixel (in order to represent the pixel value). In this embodiment, a block (class tap) is comprised of four pixels as stated above. Therefore, if clustering was performed toward such blocks (class taps), a very large number of $(2^8)^4$) of classes are created.

And so, the clustering circuit 12 exposes the block (class tap) to, for instance, ADRC processing, so that the number of bits of the pixels that compose the block can be lessened, and the number of classes can be reduced. In the clustering circuit 12 of this embodiment, in fact, one-bit ADRC processing is performed; however, two-bit ADRC processing is described hereinafter, in order to explain ADRC processing.

Figure 11A:
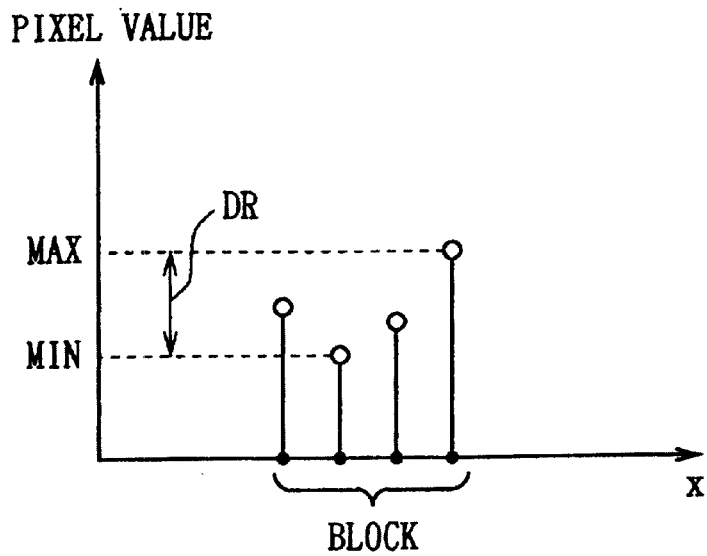
FIG. 11 is a diagram illustrating ADRC that is utilized for clustering.

That is, for instance, now, in order to simplify the explanation, as shown in FIG. 11(A), considering a block that is comprised of four pixels aligned on a straight line, in ADRC processing, the maximum value MAX and the minimum value MIN of the pixel value are detected. And, DR=MAX–MIN is regarded as the local dynamic range of the block, and then the pixel value of the pixel that composes the block is re-quantized into K bits, on the basis of this dynamic range DR.

Figure 11B:
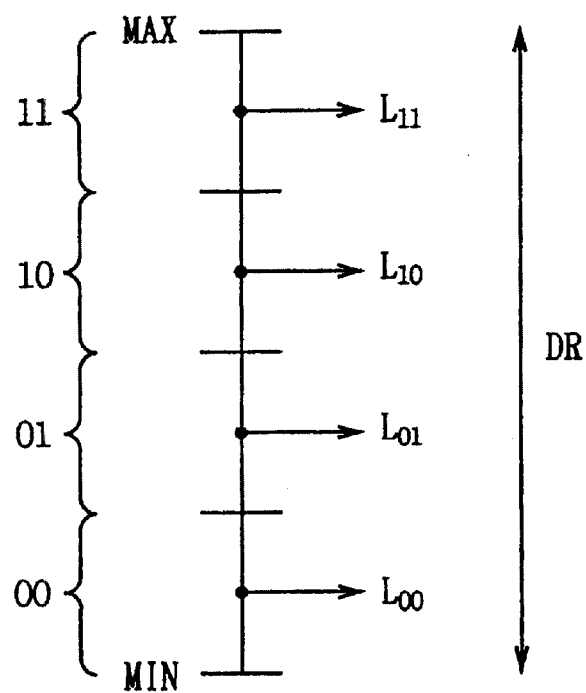

That is, the minimum value MIN is subtracted from each pixel value in the block, and the resulted differences are divided by $DR/2^K$. Then, conversion into the code (ADRC code) that corresponds to the resulted quotient is performed. To put it concretely, in the case of K=2 as an example, to which range the quotient belongs out of the ranges that are obtained by dividing the dynamic range DR into equal four (=$2^2$) parts is judged, and when the quotient belongs to the lowest range, the second range from the bottom, the third range from the bottom, or the highest range, coding is performed into 00B, 01B, 10B or 11B respectively of two bits (B designates binary numeral), as shown in FIG. 11(B).

Decoding of it can be performed by respectively converting the ADRC code 00B, 01B, 10B or 11B into the central value L00 of the lowest level range, the central value L01 of the range of the second level from the bottom, the central value L10 of the range of the third level from the bottom, or the central value L11 of the highest level range, and then adding the minimum value MIN to the value that has been obtained by said conversion.

In this connection, clustering can be performed on the basis of, for instance, tendency of levels of pixels that compose a block (class tap) (for instance, such a tendency that the levels of all pixels are nearly uniform, or that the levels of the righthand pixels are higher or lower than the levels of the other pixels), etc., other than performing on the basis of the level itself of the respective pixels that compose the block (class tap) as stated above.

Returning to FIG. 3 once more, the class that has been obtained by said clustering is given to the memory 13 as an address. The memory 13 is storing the predictive data, for each class, for predicting the negated pixel, x that has been thinned out from the pixels composing the whole-pixel dynamic image, and, when it has received the class as the address from the clustering circuit 12, it reads the predictive data that corresponds to the class and then supplies to the interpolation circuit 14.

In this case, the memory 13 is storing, for instance, a coefficient set w1, w2, w3 and w4 of a linear expression that is using the thinned pixels (pixel data) a–d (FIG. 9) (predictive tap) that are neighboring the attentional negated pixel x for the stated position (the position that is to be interpolated) upwards, downwards, left and right respectively, as the predictive data; and the linear expression is used to predict the attentional negated pixel x. Therefore, from the memory 13, the coefficient set w1–w4 that corresponds to the class for the attentional negated pixel is supplied to the interpolation circuit 14 as the predictive data.

Receiving the coefficient set w1, w2, w3 and w4 as the predictive data, the interpolation data producing circuit 14 produces (predicts) the attentional negated pixel (pixel data) x, by calculating the following linear expression, using the coefficient set w1–w4, which is treated as the predictive data, and the pixel values a–d of the thinned pixels (pixel data) that compose the block (predictive tap) supplied from the blocking circuit 11.

$$x = w1a + w2b + w3c + w4d \tag{1}$$

The attentional negated pixel (pixel data) x that has been obtained in the interpolation data producing circuit 14 is outputted to the synthesis circuit 10. At the timing for outputting the thinned pixels, the synthesis circuit 10 selects the thinned pixels (pixel data) supplied from the decoder 9, while, at the timing for outputting the negated pixels, the circuit 10 selects the negated pixels (pixel data) supplied from the interpolation data producing circuit 14, and then outputs them via the output terminal 15. As a result of this, the data of the frames that compose the whole-pixel dynamic image is outputted from the output terminal 15.

Next, for the purpose of obtaining the negated pixel (pixel data), the coefficient set w1, w2, w3 and w4, which is the predictive data for composing the linear expression of Equation (1), is found by learning.

Figure 12:
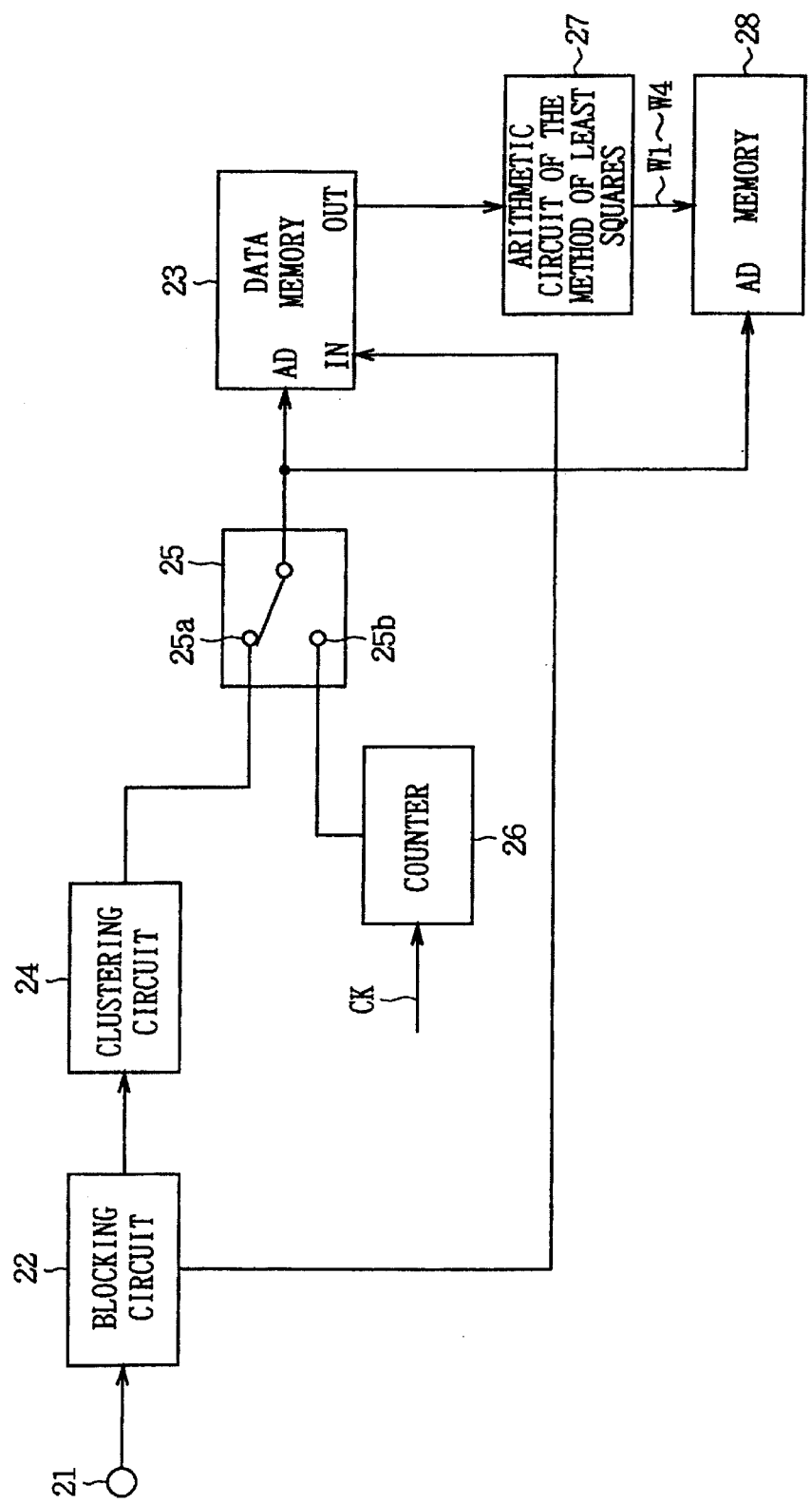
FIG. 12 is a block diagram showing a configuration of the first embodiment of a learning apparatus for finding predictive data in the first embodiment of the transmitting/receiving system to which the invention has been applied.

FIG. 12 shows an example of configuration of an embodiment of a learning apparatus that performs learning for finding the coefficient set w1, w2, w3 and w4 as the predictive data.

A whole-pixel dynamic image that is to be used in learning is inputted to an input terminal 21, in units of a frame, for instance. In this connection, it is desirable that the whole-pixel dynamic image for learning is a standard one in which production of the coefficient set w1, w2, w3 and w4 of the predictive data has been considered.

A frame of the whole-pixel dynamic image that has been inputted to the input terminal 21 is supplied to a blocking circuit 22. Treating a pixel (pixel data) that is the attentional negated pixel x shown in FIG. 9, as the attentional pixel (pixel data), the blocking circuit 22 selects the pixels (pixel data) that are regarded as the thinned and leaved pixels a–d in relation to the attentional pixel (pixel data), out of the pixels (pixel data) that are composing the supplied frame; then, the blocking circuit 22 forms a block (a class tap and a predictive tap) with these four pixels (pixel data), and supplies it to a clustering circuit 24. Besides, the blocking circuit 22 supplies five pixels (pixel data) that is the sum of four pixels (pixel data) composing the block and the attentional pixel (pixel data) x to an input terminal IN of a data memory 23.

In the same way as the clustering circuit 12 of FIG. 3, the clustering circuit 24 clusters the blocks (class taps) that are supplied to the circuit 24, and supplies the resulted class to a terminal 25a of a switch 25. The switch 25 is selecting the terminal 25a, until clustering have been finished with respect to all of blocks that are obtained from the whole-pixel dynamic image for learning; therefore, the classes in relation to the respective attentional negated pixels that are outputted from the clustering circuit 24 are supplied to the address terminal AD of the data memory 23, via the switch 25.

The data memory 23 stores the image data that is supplied to its input terminal IN, into the address corresponding to the class that is supplied to its address terminal AD.

At here, x1, x2, . . . , xn denote the attentional pixels (pixel data) related to blocks that are classified into the stated class Class, out of all blocks (class taps) that are obtained from the whole-pixel dynamic image for learning. Besides, the pixels (pixel data) that are neighboring the attentional pixel (pixel data) x1 upwards, downwards, left and right respectively are designated by a1, b1, c1 and d1; the pixels (pixel data) that are neighboring the attentional pixel (pixel data) x2 upwards, downwards, left and right respectively are designated by a2, b2, c2 and d2; . . . ; the pixels (pixel data) that are neighboring attentional pixel (pixel data) xn upwards, downwards, left and right respectively are designated by an, bn, cn and dn. In this case, by the above-mentioned processing, x1, x2, . . . , xn, a1, a2, . . . , an, b1, b2, . . . , bn, c1, c2, . . . , cn, and d1, d2, . . . , dn are stored in the address that corresponds to the class Class in the memory 23 as the respective pixel data.

When clustering have been completed with respect to all blocks (class taps) that are obtained from the whole-pixel dynamic image for learning, the switch 25 selects a terminal 25b. The terminal 25b is adapted to receive the output of a counter 26, and the counter 26 is adapted to generate addresses that sequentially change, by counting the stated clock CK. So, the addresses that are generated in the counter 26 are outputted via the switch 25.

The addresses that are outputted from the counter 26 via the switch 25 are supplied to the address terminal AD of the data memory 23 and to the address terminal AD of a memory 28.

The data memory 23 reads out its storing content (attentional pixel (pixel data)) in accordance with the address that has been supplied to the address terminal AD from the counter 26, and also reads out four pixels (pixel data) that are neighboring it, and then supplies them to an arithmetic circuit of the method of least squares 27. On the basis of the data that is supplied from the data memory 23, the arithmetic circuit of the method of least squares 27 establishes equations, and then solves the equations with the method of least squares for instance, so as to find the coefficient set w1–w4 that is treated as the predictive data.

That is, in the case where a notice has been given to the above-mentioned class Class, the arithmetic circuit of the method of least squares 27 makes the following simultaneous equations that are correspond to the equation (1), using the data x1, x2, . . . , xn, a1, a2, . . . , an, b1, b2, . . . , bn, c1, c2, . . . , cn, and d1, d2, . . . , dn that have been stored in the address corresponding to the class Class of the data memory 23.

$$x1=w1a1+w2b1+w3c1+w4d1$$

$$x2=w1a2+w2b2+w3c2+w4d2$$

.

.

.

$$xn=w1an+w2bn+w3cn+w4dn \quad (2)$$

And then, the arithmetic circuit of the method of least squares 27 solves the simultaneous equations of the equation (2) by the method of least squares, and hereby finds the coefficient set w1–w4 that is treated as the predictive data of the class Class. The predictive data related to the other classes can be found in like manner.

The coefficient set w1–w4, which is treated as the predictive data, that has been found in the arithmetic circuit of the method of least squares 27 is supplied to a memory 28. Therefore, the coefficient set w1–w4, which is treated as the predictive data related to the class Class, is stored in the same address of the memory 28 as the address of the memory 23 in which the data x1, x2, . . . , xn, a1, a2, . . . , an, b1, b2, . . . , bn, c1, c2, . . . , cn, and d1, d2, . . . , dn is being stored. The coefficient sets that are treated as the predictive data related to the other classes are stored in the memory 28 in like manner.

Figure 13:
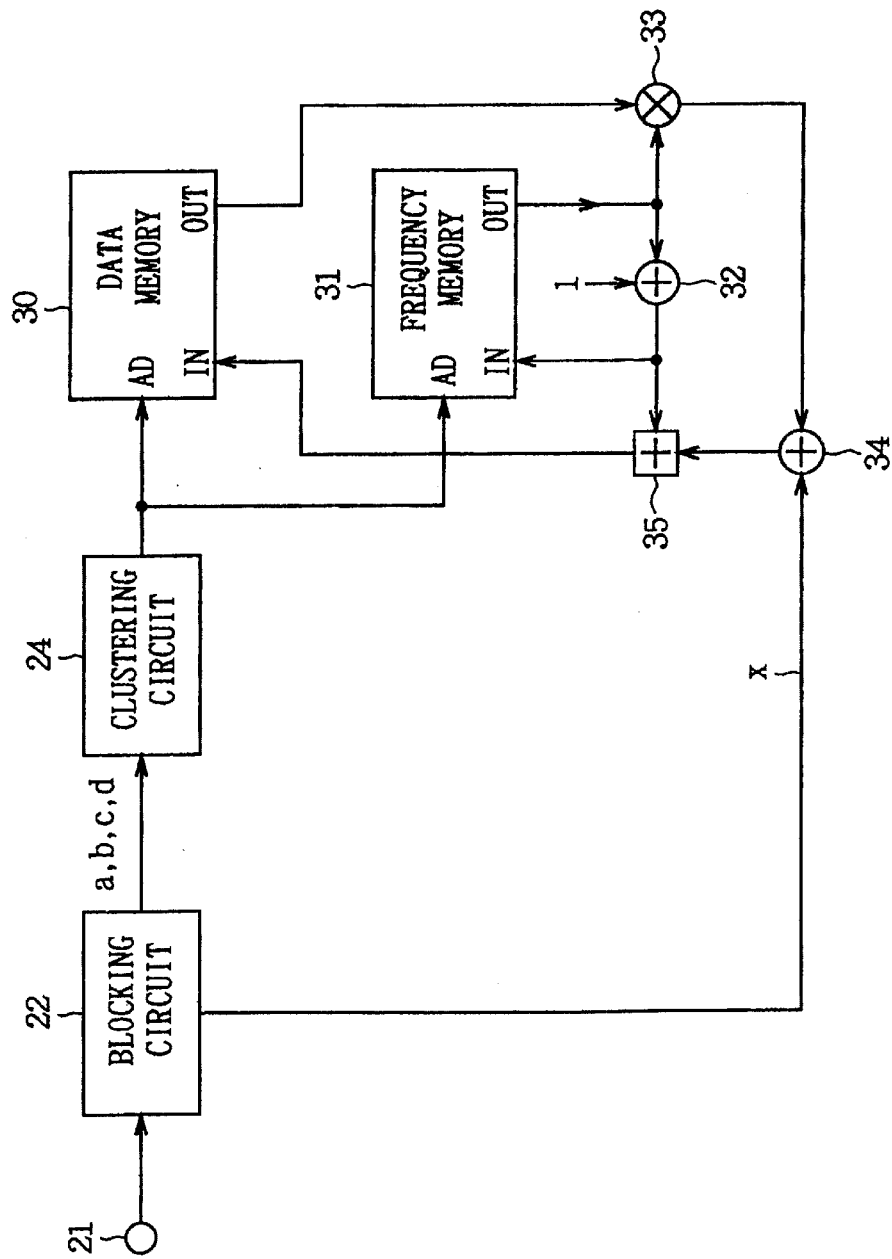
FIG. 13 is a block diagram showing a configuration of the second embodiment of the learning apparatus for finding predictive data in the first embodiment of the transmitting/receiving system to which the invention has been applied.

In the memory 13 of FIG. 13, the predictive data that have been stored in the memory 28 in this manner are stored.

Next, into the memory 13 of FIG. 3, the pixel value itself can be stored as the predictive data, other than the coefficient set for use in calculation of the linear expression shown in the equation (1).

FIG. 13 shows an example of configuration of the second embodiment of the learning apparatus for finding the predictive data, of the case where the pixel value is stored in the memory 13 as the predictive data. In this figure, the parts that correspond to the parts in FIG. 12 have the same reference numerals.

The whole-pixel dynamic image that is to be used in learning is inputted to the input terminal 21, and the frames of the whole-pixel dynamic image are supplied to the blocking circuit 22. From the pixels that are composing the supplied frame, the blocking circuit 22 forms blocks (class taps) in the same way as the case of FIG. 12, and supplies them to the clustering circuit 24. Besides, the blocking circuit 22 supplies only attentional pixels (pixel data) that become the attentional negated pixels x to a computing element 34.

The clustering circuit 24 clusters the supplied blocks (class taps) in the same way as the clustering circuit 12 of FIG. 3, and supplies the resulted class to the address terminal AD of the data memory 30 and to the address terminal AD of a frequency memory 31.

Before learning is commenced, the stored contents of the data memory 30 and the frequency memory 31 are cleared to 0.

When the class that is treated as an address has been supplied to the address terminal AD of the frequency memory 31, the frequency that is the stored contents of the very address is read out, and outputted from the output terminal OUT of the frequency memory 31. The frequency that has been outputted from the frequency memory 31 is supplied to a computing element 32, and increased by 1. The result of this incrementing is supplied to the input terminal IN of the frequency memory 31, and stored (overwritten) in the address in which the frequency that is not yet incremented has been being stored.

As to the data memory 30, when the class that is treated as an address has been supplied to its address terminal AD, the stored contents of the very address is read out too, and outputted from its output terminal OUT. The output of the data memory 30 is supplied to a computing element 33. The frequency that is outputted by the frequency memory 31 is also supplied to the computing element 33, and multiplication of this frequency by the output of the data memory 30 is performed at there. The result of this multiplication is supplied to a computing element 34.

In the computing element 34, the resulted product of the multiplication that has been performed in the computing element 33 is added to the pixel value of the attentional pixel (pixel data) that has been delivered from the blocking circuit 22, and the obtained sum value is supplied to a computing element 35. In addition, the result of incrementing of the frequency that has been performed by the computing element 32 is also supplied to the computing element 35, and a division is performed at there, treating the result of addition that has been performed in the computing element 34 as the dividend, and treating the result of incrementing that has been performed in the adder 32 as the divisor. The result of this division is supplied to the input terminal IN of the data memory 30, and stored (overwritten) in the address corresponding to the class that is outputted from the clustering circuit 24.

In the case of the first accessing to a certain address ad of the data memory 30 and the frequency memory 31 in the learning apparatus of FIG. 13, the data x1 that is supplied to the computing element 34 from the blocking circuit 22 is written in the address ad of the data memory 30 as it is, and 1 is written in the address ad of the frequency memory 31. Supposing that accessing to the address ad is subsequently performed again and the data that is supplied to the computing element 34 from the blocking circuit 22 is x2, the output of the computing element 32 becomes 2, and the output of the computing element 34 becomes x1+x2; therefore, the output of the computing element 35 becomes (x1+x2)/2, and this value is written into the address ad of the data memory 30. And, into the address ad of the frequency memory 31, the value 2 that is the output of the computing element 32 is written. Supposing that accessing to the address ad is performed again and the data that is supplied to the computing element 34 from the blocking circuit 22 is x3, the value (x1+x2+x3)/3 is written into the address ad of the data memory 30, and the value 3 is written into the address ad of the frequency memory 31.

In this way, the mean value of the pixel values of the attentional pixels (pixel data) that are classified into each class is stored in the data memory 30.

In the case where the pixel values that have been stored in the data memory 30 is stored in the memory 13 of FIG. 3 as the data for prediction, reading the pixel value that is regarded as the predictive data from the memory 13 is predicting the negated pixel, therefore, it is not needed to provide the interpolation data producing circuit 14.

Figure 9:
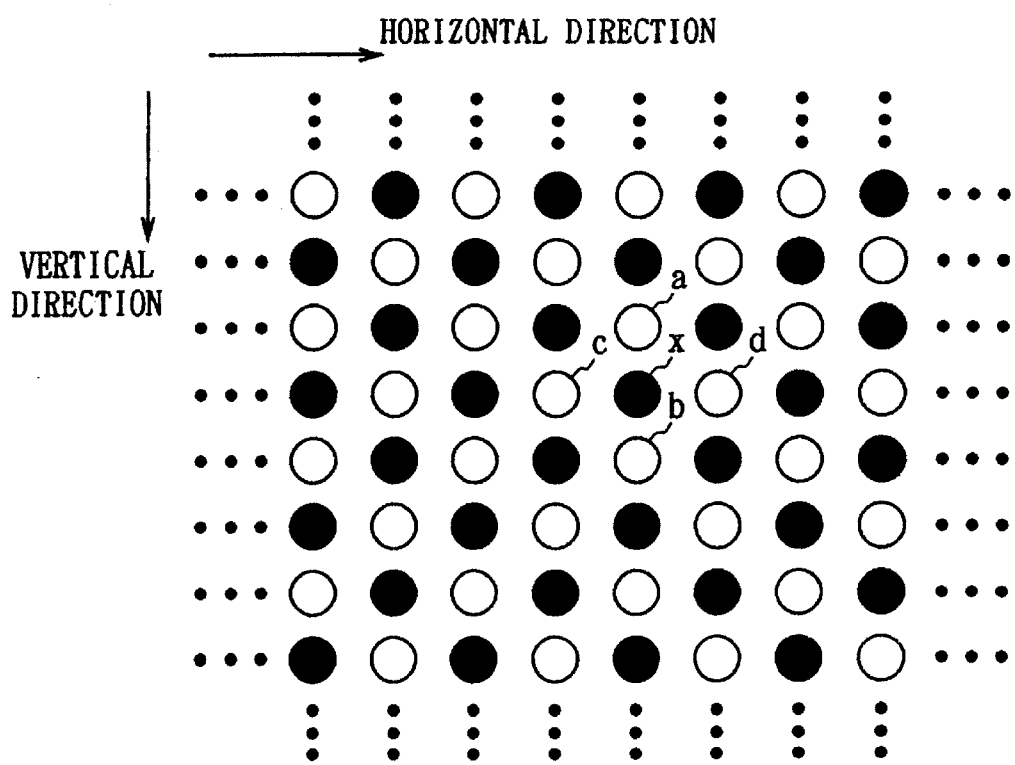
FIG. 9 is a diagram illustrating the processing of a blocking circuit 11 of FIG. 3.

By the way, in the above-mentioned case, the blocking circuit 11 of FIG. 3 forms one block (a class tap and a predictive tap) with four thinned pixels (pixel data) a, b, c and d that are neighboring the attentional negated pixel x upwards, downwards, left and right respectively in the spatial direction, as shown in FIG. 9; however, it is able to form a block such that the block includes also the thinned pixels that are neighboring the attentional negated pixel x in the temporal direction.

Figure 14:
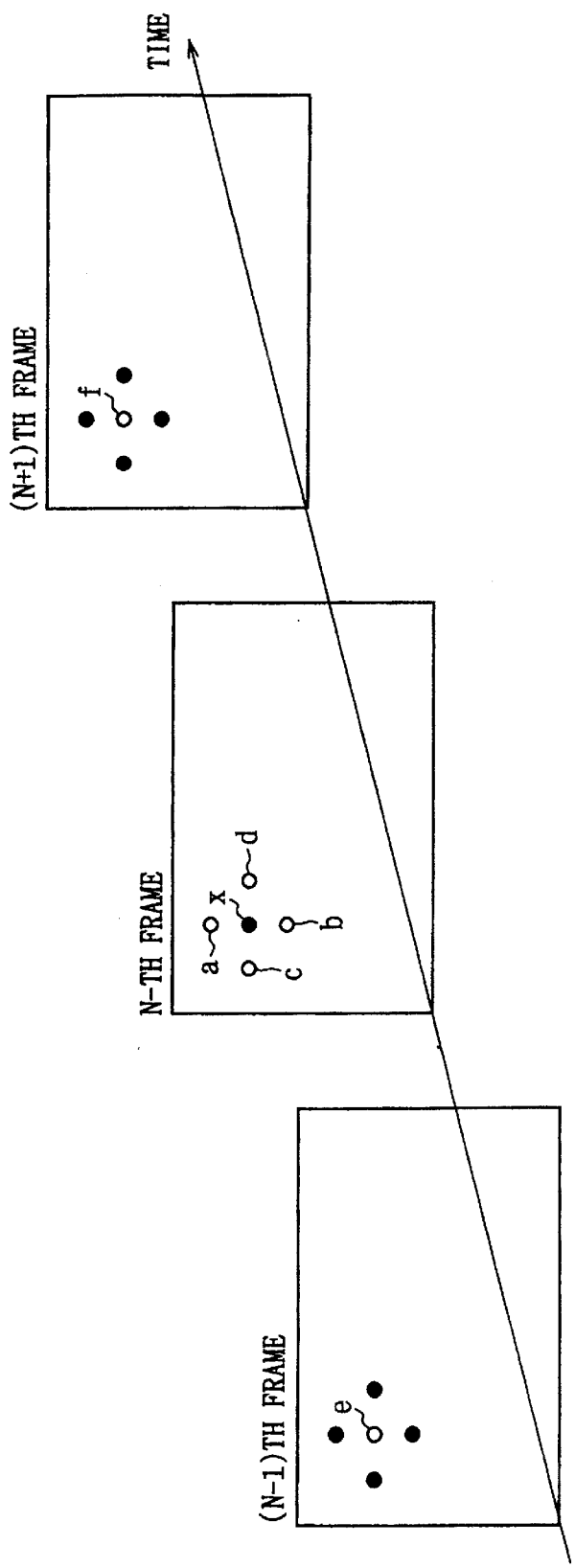
FIG. 14 is a diagram illustrating the processing of the blocking circuit 11 of FIG. 3.

That is, in the case of forming a block with respect to a certain attentional negated pixel x of the n-th frame, it is able to form the block (a class tap and a predictive tap) with six pixels (pixel data) that is the total of four thinned pixels (pixel data) a, b, c and d neighboring upwards, downwards, left and right respectively in the identical frame, the thinned pixel (pixel data) e that is resting on the same position of the (n−1)th frame as the position of the attentional negated pixel x, and the thinned pixel (pixel data) f that is resting on the same position of the (n+1)th frame as the position of the attentional negated pixel x, as shown in FIG. 14.

In this case, it is able to restore the negated pixel x such that it becomes closer to the original, because clustering and calculation of the equation (1) are performed considering the thinned pixels (pixel data) e and f of the temporal direction. In this case, it is needed to form a block in like manner at the time of learning also. Besides, a block (a class tap and a predictive tap) can be composed of only thinned pixels that are located in the temporal direction of the attentional negated pixel x.

In this embodiment, when the notice has been given to a certain negated pixel, the thinned pixels that are used for clustering and the thinned pixels that are used for calculating the linear expression shown in the equation (1) are identical, however, these are not always required to be the identical pixels. That is, it is able to use the distinct sets of thinned pixels, for clustering and for calculation of the equation (1). Besides, the method for clipping a class tap or a predictive tap may be changed adaptively, in accordance with the spatial feature (activity), movement, and others of the image.

Besides, thinned pixels that are used for clustering and thinned pixels that are used for calculating the linear expression shown in the equation (1) are not required to neighbor the negated pixel spatially or temporally. But, it is desirable to use the thinned pixels that are resting on the periphery of the negated pixel.

Besides, ADRC processing has been used in the clustering circuit, and the class has been determined on the basis of the spatial activity, however, the movement of the block that has been detected may be used as the class, or the class may be determined based on the combination of ADRC processing and movement detection.

In addition, only negated pixels have been produced in this embodiment, however, thinned pixels may be newly produced in like manner. In this case, the synthesis circuit 10 is not needed anymore.

In this embodiment, each pixel of the respective frames that compose a dynamic image was 8 bits, however, we do not intend to limit the present invention to such; each pixel may be comprised of more bits than 8 bits such as 10 bits and 12 bits, and also may be comprised of less bits than 8 bits.

In the above receiver 20D, a negated pixel is predicted using the predictive data that has been obtained by learning, so that it is able to restore the high frequency components that are not included within the image that is comprised of the thinned pixels; however, restoring the thinned pixel can be performed by a simple interpolation too.

Figure 15:
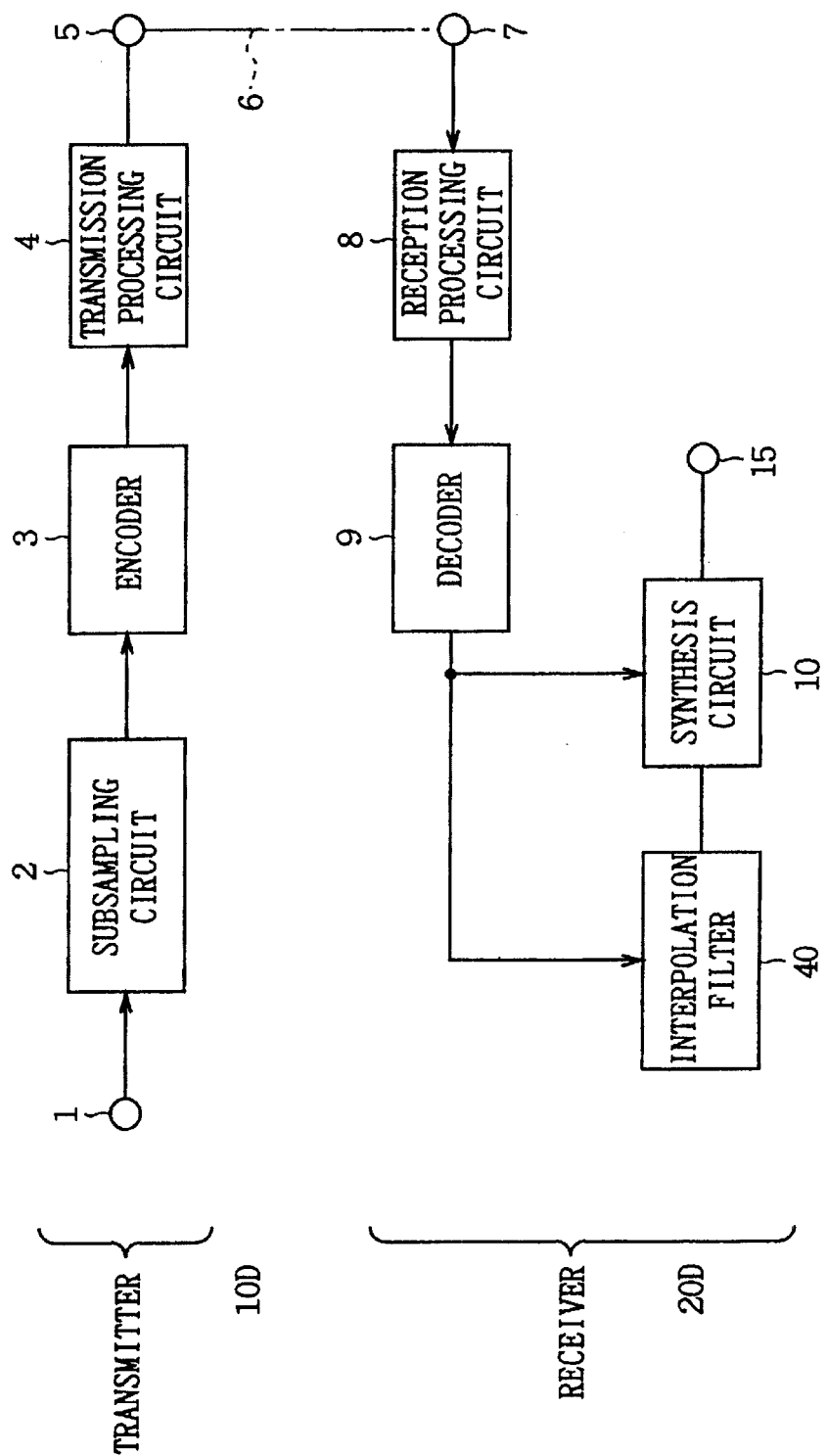
FIG. 15 is a block diagram showing a configuration of the second embodiment of the transmitting/receiving system to which the invention has been applied.

FIG. 15 shows an example of a configuration of the second embodiment of such a transmitting/receiving system. In this figure, the parts that correspond to the parts in FIG. 1 have the same reference numerals. That is, this transmitting/receiving system is composed like the transmitting/receiving system of FIG. 3, excepting that an interpolation filter 40 is provided in place of the blocking circuit 11, the clustering circuit 12, the memory 13, and the interpolation data producing circuit 14.

In the interpolation filter 40, out of the thinned pixels (pixel data) that have been delivered from the decoder 9, the mean value of the thinned pixels (pixel data) that are resting on the periphery of the negated pixel is found, and then this mean value is outputted to the synthesis circuit 10 as the interpolation value of the negated pixel (pixel data).

In this case, it is not able to restore the high frequency components that are not included within the image data that is comprised of the thinned pixels (pixel data) like the case of FIG. 3; however, it is able to simplify the configuration of the receiver 20D.

Figure 16:
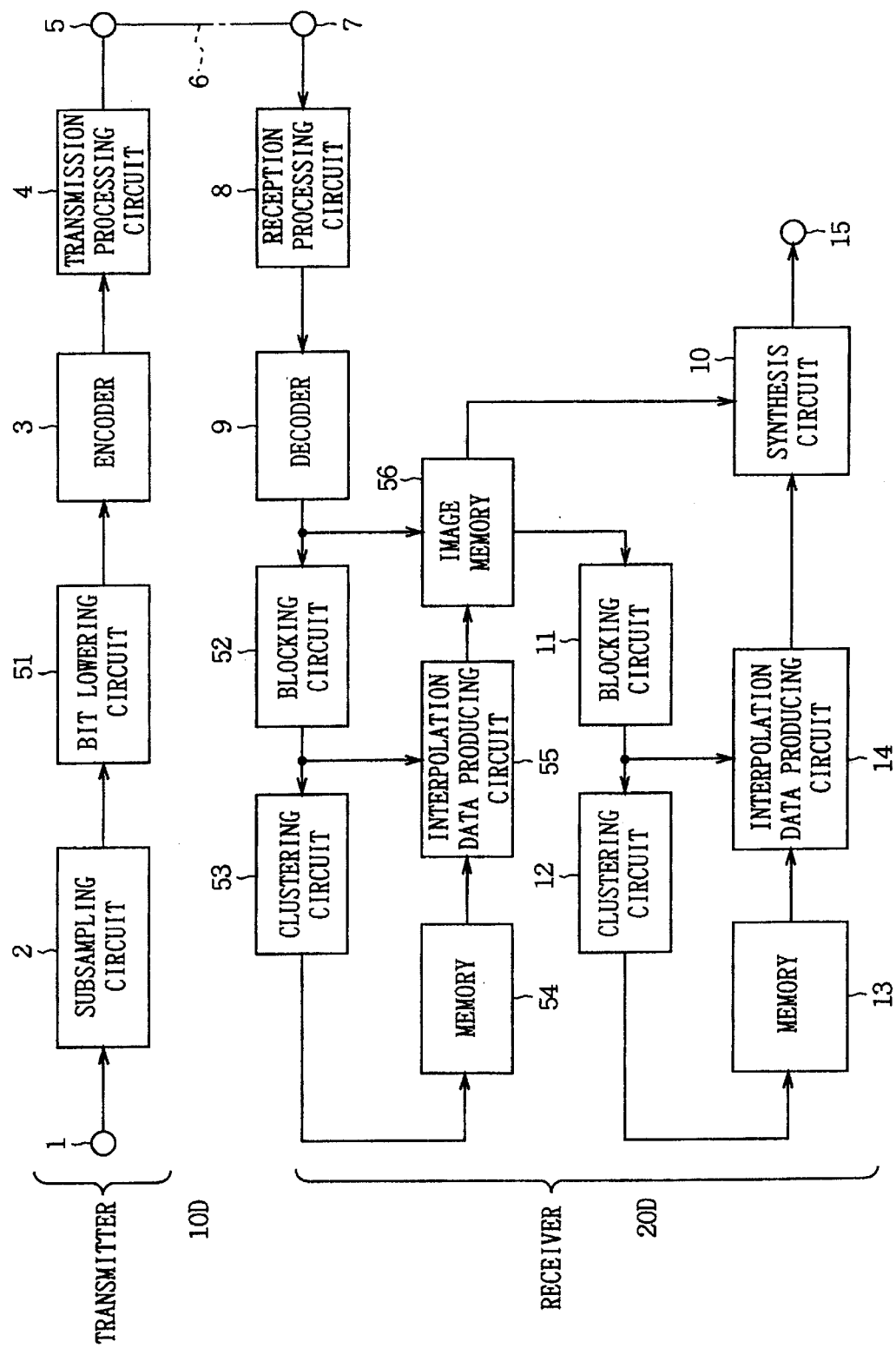
FIG. 16 is a block diagram showing a configuration of the third embodiment of the transmitting/receiving system to which the invention has been applied.

Next, an explanation is given to a configuration of the third embodiment of the transmitting/receiving system to which the invention has been applied. FIG. 16 shows an example of the configuration of the transmitting/receiving system of the third embodiment. In this figure, the parts that correspond to the parts in FIG. 3 have the same reference numerals.

This transmitting/receiving system of the third embodiment is comprised of a transmitter 10D and a receiver 20D. And, the transmitter 10D is comprised of an input terminal 1, a subsampling circuit 2, a bit lowering circuit 51, an encoder 3, a transmission processing circuit 4 and an output terminal 5, and capable of thinning the pixels of the image data, lowering the bits of the thinned pixels with respect to the direction of the level thereby compressing them, and transmitting them; while, the receiver 20D is comprised of an input terminal 7, a reception processing circuit 8, a decoder 9, a blocking circuit 52, a clustering circuit 53, a memory 54, a pixel data producing circuit 55, an image memory 56, a synthesis circuit 10, a blocking circuit 11, a clustering circuit 12, a memory 13, an interpolation data producing circuit 14 and an output terminal 15, and capable of expanding the compressed image data that is delivered from the transmitter 10D.

That is, the transmitter 10D is supplied with a digital image data of the dynamic image (which may be referred to as a whole-pixel dynamic image, hereinafter), in the same way as the first embodiment shown in FIG. 3. It is assumed that each pixel that is composing this digital image data is 12 bits. This digital image data is supplied to the subsampling circuit 2, via the input terminal 1. In the subsampling circuit 2, in the same way as the first embodiment shown in FIG. 3, pixels of the respective frames that compose a dynamic image, that is a digital image data, are thinned and compressed in such a manner that they become the chessboard-like lattice pattern in both directions of the spatial direction and the temporal direction as shown in FIG. 4 as an example. That is, with respect to the respective frames of the whole-pixel dynamic image, thinning is performed into the chessboard-like lattice pattern in both directions of the spatial direction and the temporal direction (this may be referred to as spatial/temporal chessboard-like pattern thinning, hereinafter), so that the thinned image data is produced in which the alternate pixels are leaved in either direction of the spatial direction and the temporal direction. The thinned image data that is comprised of the thinned pixels (pixel data) that have been subjected to spatial/temporal chessboard-like pattern thinning at the subsampling circuit 2 is supplied to the bit lowering circuit 51.

The bit lowering circuit 51 eliminates the bits of 4 bits from LSB (least significant bit) out of 12 bits of each pixel (pixel data) of the supplied thinned image data, and produces a bit modification pixel (pixel data) of 8 bits. Then, the modified thinned image data that is comprised of the respective bit modification pixels (pixel data) is supplied to the encoder 3.

In the encoder 3, the modified thinned image data is subjected to high efficiency coding, and supplied to the transmission processing circuit 4 as the coded data, as with the first embodiment shown in FIG. 3. The transmission processing circuit 4 exposes the coded data to required signal processings such as error correction, arranging into packets, and channel coding, and outputs the resulted transmission data via the output terminal 5, as with the first embodiment shown in FIG. 3. This transmission data is transmitted via the stated transmission line 6, in like manner.

The transmission data from the transmission line 6 is received by the reception processing circuit 8, via the input terminal 7 of the receiver 20D. In the reception processing circuit 8, the transmission data is subjected to the required signal processings such as channel decoding, packet disassembling, and error correction; the coded data that is obtained as a result of it is supplied to the decoder 9. In the decoder 9, this coded data is decoded through the decoding process that corresponds to the coding process of the encoder 3 of the transmitter 10D, hereby it becomes the modified thinned image data that is comprised of the bit modification pixels (pixel data), and then it is supplied to the blocking circuit 52.

Figure 17:
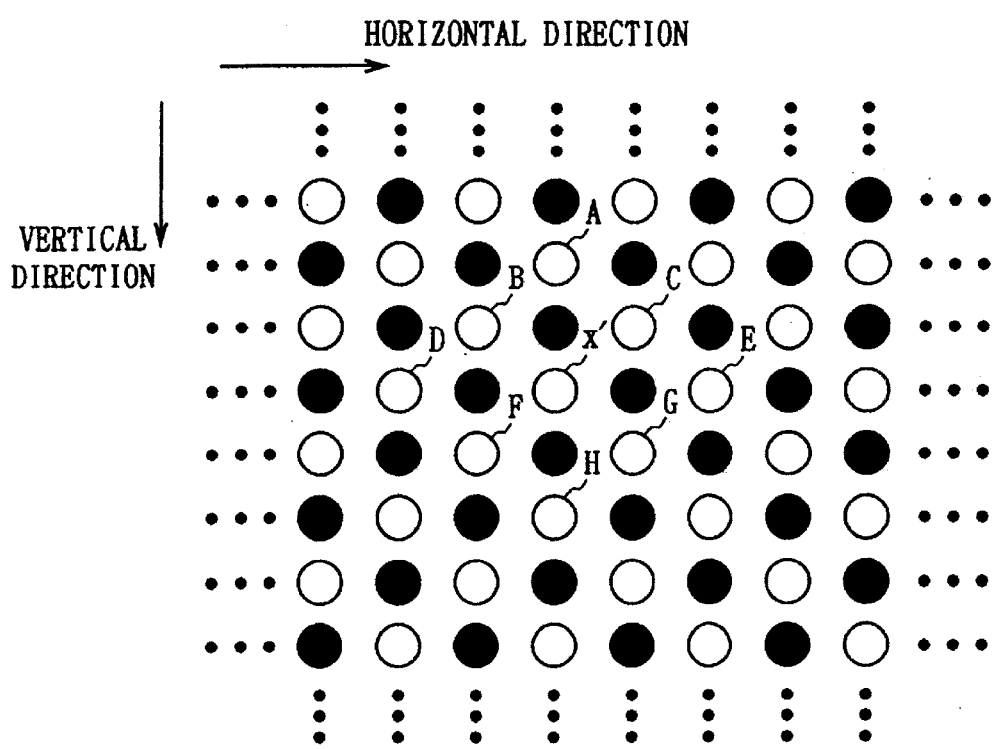
FIG. 17 is a diagram illustrating the processing of a clustering circuit 53 of FIG. 16.

As shown in FIG. 17 for instance, the blocking circuit 52 groups eight bit modification pixels (pixel data) A, B, C, D, E, F, G and H that are neighboring the attentional bit modification pixel x upwards, downwards, left, right and obliquely of the spatial direction into one block, to generate a class tap and a predictive tap, and then supplies the class tap to the clustering circuit 53 and supplies the predictive tap to the pixel data producing circuit 55, respectively. In relation to each bit modification pixel, the blocking circuit 52 composes a block that is comprised of the bit modification pixel (pixel data) neighboring the bit modification pixel upwards, downwards, left, right and obliquely, and then supplies it to the clustering circuit 53 as a class tap, and to the interpolation data producing circuit 55 as a prediction tap, respectively. As used herein, the class tap and the prediction tap are the same one.

The clustering circuit 53 clusters the blocks that have been delivered from the blocking circuit 52 into the stated class, in accordance with the properties of the bit modification pixels that are composing the blocks. The principle of clustering has been described using FIG. 10 and FIG. 11 at the time of description of the first embodiment, so the description of it is omitted here.

The clustering circuit 53 exposes eight bit-modification pixels (pixel data) that are composing the block (class tap) to 1-bit ADRC processing, thereby generating a 8-bit class code that represents the class concerning the attentional bit modification pixel x'.

The class that has been obtained by clustering like the above is given to the memory 54 as an address. The memory 54 is storing the predictive data for predicting a 12-bit pixel from a bit modification pixel x that has been modified to 8 bits, for each class, and, when the class that is regarded as an address has been given from the clustering circuit 53, reads the predictive data that corresponds to that class, and supplies it to the pixel data producing circuit 55.

In the present case, the memory 54 is storing the coefficient set w1, w2, w3, w4, w5, w6, w7 and w8 of a linear expression for predicting the attentional bit modification pixel x' of the stated position by use of the linear expression that is using the bit modification pixels (pixel data) A–H (FIG. 17)(predictive tap) that are neighboring the attentional bit modification pixel x' upwards, downwards, left and right respectively, as the predictive data. Therefore, from the memory 55 to the pixel data producing circuit 55, the coefficient set w1–w8 that is corresponding to the class concerning the attentional bit modification pixel is supplied as the predictive data.

When a coefficient set w1–w8 that is regarded as the predictive data has been received, the pixel data producing circuit 55 calculates the following linear expression by the use of the coefficient set w1–w8 that is regarded as the predictive data and the pixel values A–H of the bit modification pixels (pixel data) comprising the block (predictive tap) that has been supplied from the blocking circuit 11, and hereby produces (predicts) 12-bit restored pixel (pixel data) concerning 8-bit attentional bit modification pixel x.

$$x = w1A + w2B + w3C \ldots + w8H \quad (3)$$

The pixel x' that has been obtained in the pixel data producing circuit 55 is supplied to the image memory 56 and stored therein. The above-mentioned processing is performed in relation to, for instance, 1 frame, and the pixel data that has been respectively produced is stored in the image memory. The image data that is comprised of the pixels stored in the image memory 56 is restored as the thinned image data that is nearly the same as the thinned image data that is the output of the subsampling circuit 2 of the transmitter 10D.

The thinned image data that has been stored in the image memory 56 is the same as the thinned image data that has been outputted from the decoder 9 of the receiver 20D of the first embodiment shown in FIG. 3; in the third embodiment too, the negated pixels are produced in relation to the thinned image data that has been stored in the image memory 56, and the image data is restored, in the same way as the first embodiment shown in FIG. 3. As a result of this, from the output terminal 15, the data of the frames that compose the whole-pixel dynamic image is outputted. The configurations and the operations of the blocking circuit 11, the clustering circuit 12, the memory 13, the interpolation data producing circuit 14 and the synthesis circuit 10 of the receiver 20D of the third embodiment shown in FIG. 16 are the same as those of the first embodiment, so the explanation is omitted here.

Next, to obtain 12-bit restored pixel (pixel data) x' from 8-bit bit modification pixel (pixel data), the set of coefficients w1, w2, w3, w4, w5, w6, w7 and w8 that is regarded as the predictive data for comprising the linear expression of the equation (3) is obtained by learning.

Figure 18:
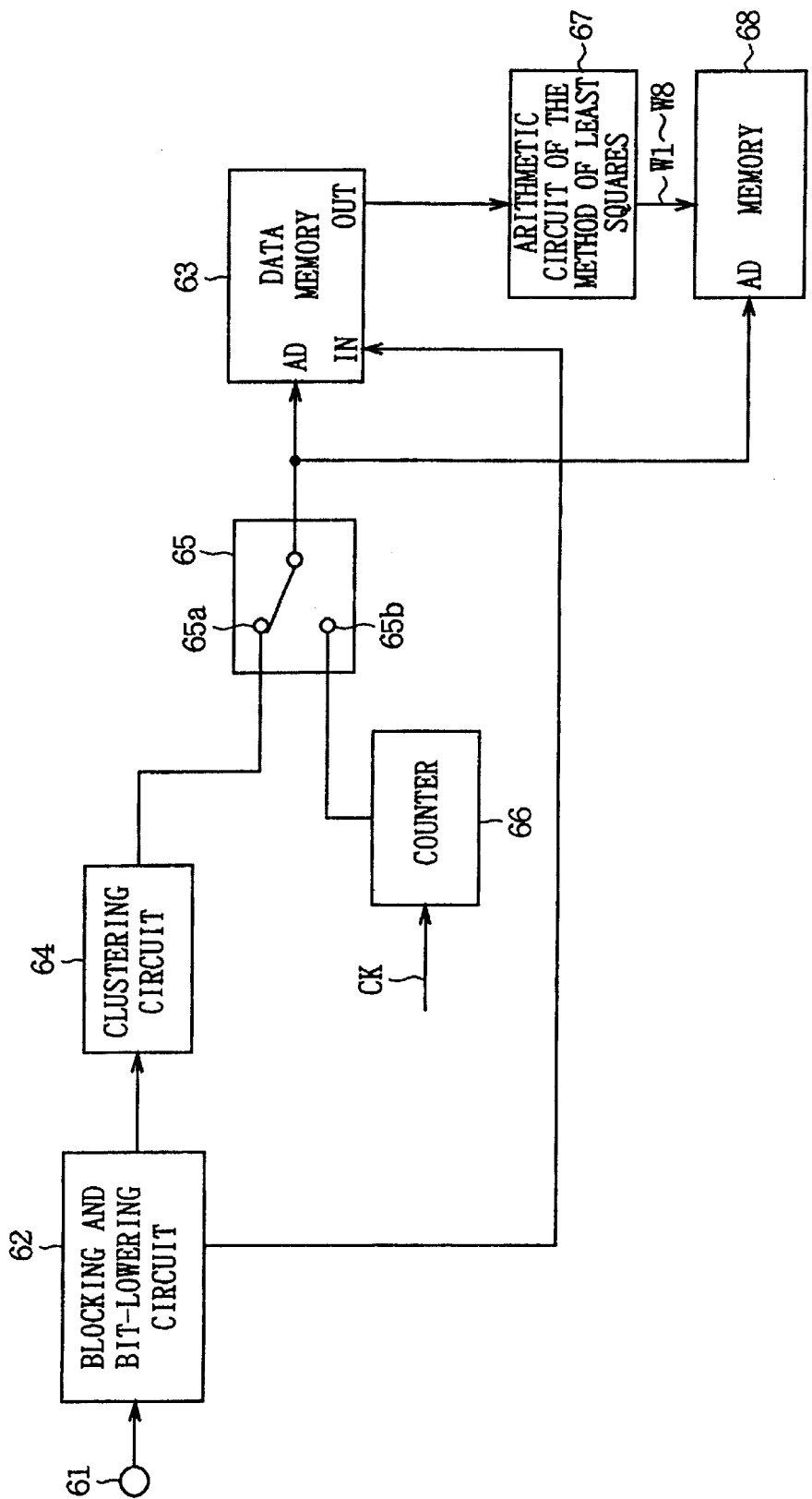
FIG. 18 is a block diagram showing a configuration of the first embodiment of a learning apparatus for finding predictive data in the second embodiment of the transmitting/receiving system to which the invention has been applied.

FIG. 18 shows an example of the configuration of the first embodiment of the learning apparatus that performs learning for finding the set of coefficients w1, w2, w3, w4, w5, w6, w7 and w8 that is regarded as the predictive data for finding the 12-bit restored pixel (pixel data) x' from the 8-bit bit modification pixel (pixel data) in the third embodiment.

A whole-pixel dynamic image for learning, each pixel of which is 12 bits, is inputted to an input terminal 21, in units of a frame, for instance. In this connection, it is desirable that the whole-pixel dynamic image for learning is a standard one in which production of the coefficient set w1, w2, w3, w4, w5, w6, w7 and w8 of the predictive data has been considered.

A frame of the whole-pixel dynamic image that has been inputted to the input terminal 61 is supplied to a blocking and bit-lowering circuit 62. Treating a 12-bit pixel of the stated attentional bit modification pixel x' shown in FIG. 17 as the attentional pixel (pixel data), the blocking and bit-lowering circuit 62 selects the 12-bit pixels (pixel data) that are regarded as the bit modification pixels (pixel data) A–H in relation to the attentional pixel, out of the pixels that are composing the supplied frame. Then, the blocking circuit 22 eliminates the bits that are 4 bits from LSB (least significant bit), out of 12 bits of each pixel of the selected eight pixels (pixel data), to produce a 8-bit bit modification pixel (pixel data). Then, it forms a block (a class tap and a predictive tap) with the produced eight bit modification pixels (pixel data), and supplies it to a clustering circuit 64. Besides, the blocking and bit-lowering circuit 62 supplies nine pixels (pixel data) that is the sum of the eight bit-modification pixels (pixel data) that are composing the block and the attentional pixel (pixel data) x to an input terminal IN of a data memory 23.

In the same way as the clustering circuit 53 of FIG. 16, the clustering circuit 64 clusters the blocks (class taps) that are supplied thereto, and supplies the resulted class to a terminal 65a of a switch 65. The switch 65 is selecting the terminal 65a, until clustering have been finished with respect to all of blocks that are obtained from the whole-pixel dynamic image for learning; therefore, the classes in relation to the respective attentional bit-modification pixels that are outputted from the clustering circuit 64 are supplied to the address terminal AD of the data memory 63, via the switch 65.

The data memory 63 stores the image data that is supplied to its input terminal IN, into the address corresponding to the class that is supplied to its address terminal AD.

At here, the attentional pixels (pixel data) related to blocks that are classified into the stated class Class, out of all blocks (class taps) that are obtained from the whole-pixel dynamic image for learning, are denoted by x'1, x'2, . . . , x'n. Besides, the bit modification pixels (pixel data) that are neighboring the attentional pixel x1 upwards, downwards, left and right are denoted by A1, B1, C1, D1, E1, F1, G1 AND H1; the bit modification pixels (pixel data) that are neighboring the attentional pixel (pixel data) x2 upwards, downwards, left and right are denoted by A2, B2, C2, D2, E2, F2, G2 and H2; . . . ; the bit modification pixels (pixel data) that are neighboring the attentional pixel (pixel data) xn upwards, downwards, left and right are denoted by An, Bn, Cn, Dn, En, Fn, Gn and Hn. In this case, by the above-mentioned processing, x'1, x'2, . . . , x'n, A1, A2, . . . , An, B1, B2, . . . , Bn, C1, C2, . . . , Cn, D1, D2, . . . , Dn, E1, E2, . . . , En, F1, F2, . . . , Fn, G1, G2, . . . , Gn, and H1, H2, . . . , Hn are stored in the address that corresponds to the class Class in the memory 23 as the respective pixel data.

When clustering have been completed with respect to all blocks (class taps) that are obtained from the whole-pixel dynamic image for learning, the switch 65 selects a terminal 65b. The terminal 65b is supplied with the output of a counter 66, and the counter 66 is adapted to generate addresses that sequentially change, by counting the stated clock CK. So, the addresses that are generated by the counter 66 are outputted via the switch 65.

The addresses that are outputted from the counter 66 via the switch 65 are supplied to the address terminal AD of the data memory 63 and to the address terminal AD of a memory 68.

The data memory 63 reads out its storing content (attentional pixel (pixel data)) and the neighboring bit-modification pixels (pixel data), in accordance with the address that has been supplied to its address terminal AD from the counter 66, and then supplies them to an arithmetic circuit of the method of least squares 67. On the basis of the data that is supplied from the data memory 63, the arithmetic circuit of the method of least squares 67 establishes equations, and then solves the equations with the method of least squares for instance, so as to find the coefficient set w1–w8 that is regarded as the predictive data.

That is, in the case where a notice has been given to the above-mentioned class Class, the arithmetic circuit of the method of least squares 27 establishes the following simultaneous equations that are correspond to the equation (3), using the data x'1, x'2, ..., x'n, A1, A2, ..., An, B1, B2, ..., Bn, C1, C2, ..., Cn, D1, D2, ..., Dn, E1, E2, ..., En, F1, F2, ..., Fn, G1, G2, ..., Gn, and H1, H2, ..., Hn that have been stored in the address corresponding to the class Class of the data memory 23.

$$x'1 = w1A1 + w2B1 + w3C1 + w4D1 + w5E1 + w6F1 + w7G1 + w8H1$$

$$x'2 = w1A2 + w2B2 + w3C2 + w4D2 + w5E2 + w6F2 + w7G2 + w8H2$$

.

.

.

$$x'n = w1An + w2Bn + w3Cn + w4Dn + w5En + w6Fn + w7Gn + w8Hn \quad (4)$$

And then, the arithmetic circuit of the method of least squares 67 solves the simultaneous equations of the equation (4) by the method of least squares, and hereby finds the coefficient set w1–w8 that is regarded as the predictive data of the class Class. The predictive data related to the other classes can be found in like manner.

The coefficient set w1–w4, which is regarded as the predictive data, that has been found in the arithmetic circuit of the method of least squares 67 is supplied to the memory 68. Therefore, the coefficient set w1–w4, which is regarded as the predictive data related to the class Class, is stored in the same address of the memory 68 as the address of the memory 63 in which the data x'1, x'2, ..., x'n, A1, A2, ..., An, B1, B2, ..., Bn, C1, C2, ..., Cn, D1, D2, ..., Dn, E1, E2, ..., En, F1, F2, ..., Fn, G1, G2, ..., Gn, and H1, H2, ..., Hn are being stored. The coefficient sets that are regarded as the predictive data related to the other classes are stored in the memory 28 in like manner.

In the memory 54 of FIG. 16, the predictive data that have been stored in the memory 68 in this manner are stored. As to the memory 13 of FIG. 16, the coefficient set that is regarded as the predictive data and that has been produced by the learning apparatus of FIG. 12 is stored therein.

Next, into the memory 54 of FIG. 16, the pixel value itself can be stored as the predictive data, other than the coefficient set for use in calculation of the linear expression shown in the equation (3).

Figure 19:
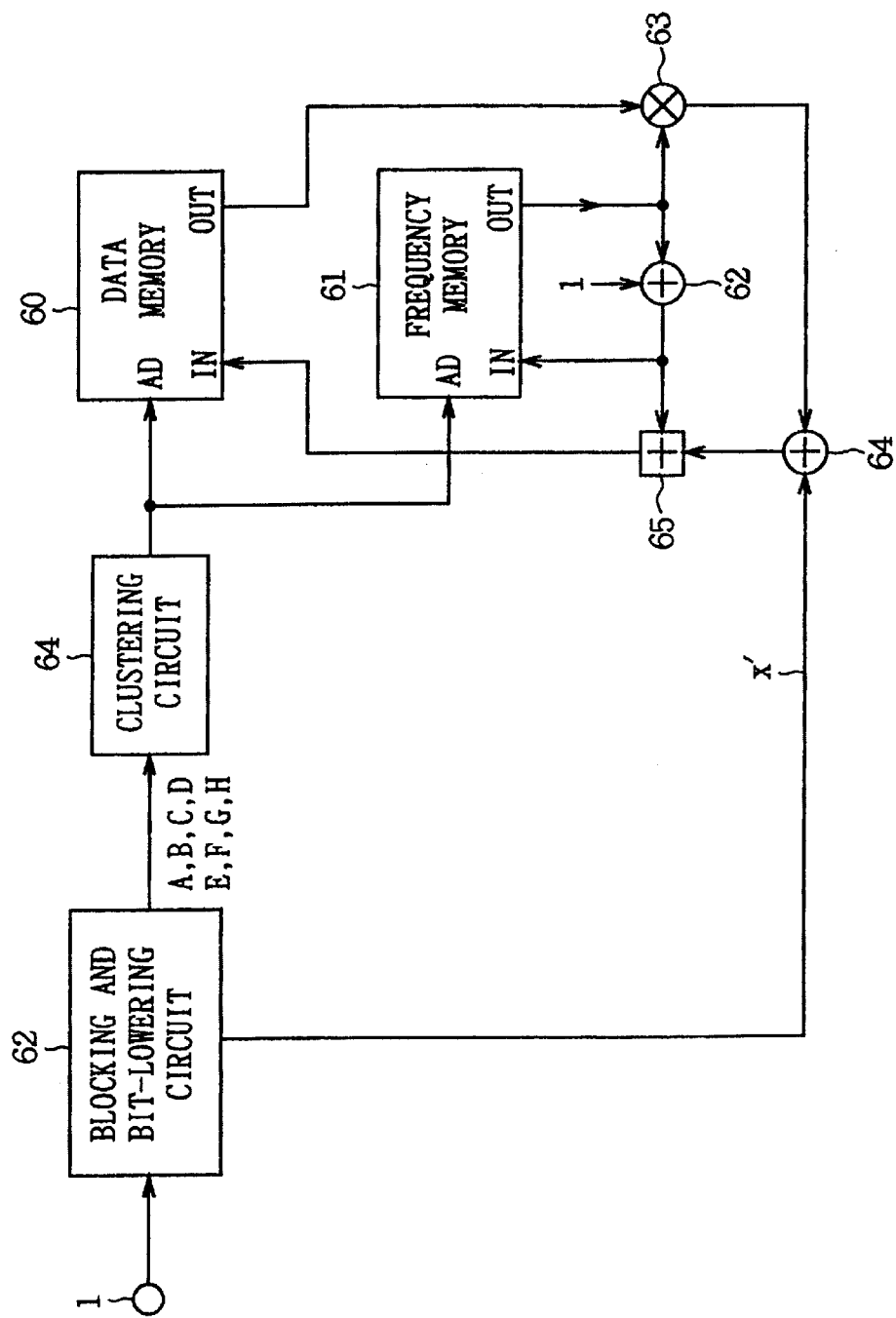
FIG. 19 is a block diagram showing a configuration of the second embodiment of the learning apparatus for finding predictive data in the second embodiment of the transmitting/receiving system to which the invention has been applied.

FIG. 19 shows an example of configuration of the second embodiment of the learning apparatus for finding the predictive data, of the case where the pixel value is stored in the memory 54 as the predictive data. In this figure, the parts that correspond to the parts in FIG. 18 have the same reference numerals.

A frame of the whole-pixel dynamic image that has been inputted to the input terminal 61 is supplied to the blocking and bit-lowering circuit 62. From the pixels that are composing the supplied frame, the blocking and bit-lowering circuit 62 forms blocks (class taps) in the same way as the case of FIG. 18, and supplies them to the clustering circuit 64. And, it supplies only 12-bit attentional pixels (pixel data) related to the stated attentional bit-modification pixel x' to a computing element 74.

The clustering circuit 64 clusters the supplied blocks (class taps) in the same way as the clustering circuit 53 of FIG. 16, and supplies the resulted class to the address terminal AD of the data memory 70 and to the address terminal AD of the frequency memory 71.

Before learning is commenced, the stored contents of the data memory 70 and the frequency memory 71 are cleared to 0.

When the class that is regarded as an address has been supplied to the address terminal AD of the frequency memory 71, the frequency that is the stored contents of the very address is read out and outputted from the output terminal OUT of the frequency memory 71. The frequency that has been outputted from the frequency memory 71 is supplied to a computing element 72, and increased by 1. The result of this incrementing is supplied to the input terminal IN of the frequency memory 71, and stored (overwritten) in the address in which the frequency that is not yet incremented has been being stored.

As to the data memory 70, when the class that is regarded as an address has been supplied to its address terminal AD, the stored contents of the very address is read out similarly, and outputted from its output terminal OUT. The output of the data memory 70 is supplied to a computing element 73. The frequency that is outputted by the frequency memory 71 is also supplied to the computing element 73, and multiplication of this frequency by the output of the data memory 70 is performed at there. The result of this multiplication is supplied to a computing element 74.

In the computing element 74, the resulted product of the multiplication that has been performed in the computing element 73 is added to the pixel value of the attentional pixel (pixel data) that has been delivered from the blocking and bit-lowering circuit 62, and the obtained sum value is supplied to a computing element 75. In addition, the result of incrementing of the frequency that has been performed by the computing element 72 is also supplied to the computing element 75, and a division is performed at there, treating the result of addition that has been performed in the computing element 74 as the dividend, and treating the result of incrementing that has been performed in the adder 72 as the divisor. The result of this division is supplied to the input terminal IN of the data memory 70, and stored (overwritten) in the address corresponding to the class that is outputted from the clustering circuit 74.

In the case of the first accessing to a certain address ad of the data memory 70 and the frequency memory 71 in the learning apparatus of FIG. 19, the data x'1 that is supplied to the computing element 74 from the blocking and bit-lowering circuit 62 is written in the address ad of the data memory 60 as it is, and 1 is written in the address ad of the frequency memory 71. Supposing that accessing to the address ad is subsequently performed again and the data that is supplied to the computing element 74 from the blocking and bit-lowering circuit 62 is x'2, the output of the computing element 72 becomes 2, and the output of the computing element 74 becomes x'1+x'2; therefore, the output of the computing element 75 becomes (x1+x2)/2, and this value is written into the address ad of the data memory 60. And, into the address ad of the frequency memory 61, the value 2 that is the output of the computing element 72 is written. Supposing that accessing to the address ad is performed again and the data that is supplied to the computing element 64 from the blocking and bit-lowering circuit 62 is x'3, the value (x1+x2+x3)/3 is written into the address ad of the data memory 60, and the value 3 is written into the address ad of the frequency memory 61.

In this way, the mean value of the pixel values of the attentional pixels related to the attentional bit modification pixels that are classified into each class is stored in the data memory 70.

In the case where the pixel values that have been stored in the data memory 70 is stored in the memory 53 of FIG. 16 as the data for prediction, reading the pixel value that is regarded as the predictive data from the memory 54 is predicting the negated pixel, therefore, it is not needed to provide the pixel data producing circuit 55. As to the memory 13 of FIG. 16, the coefficient set that is regarded as the predictive data and that has been produced by the learning apparatus of FIG. 12 is stored therein.

By the way, in the above-mentioned case, the blocking and bit-lowering circuit 51 of FIG. 16 forms one block (a class tap and a predictive tap) with eight bit-modification pixels (pixel data) A, B, C, D, E, F, G and H that are neighboring the attentional bit modification pixel x' upwards, downwards, left and right of the spatial direction, as shown in FIG. 17; however, it is able to form a block such that the block includes also the thinned pixels that are neighboring the attentional bit modification pixel x' in the temporal direction. In this case, it is able to restore the attentional bit modification pixel x' such that it becomes closer to the original, because clustering and calculation of the equation (3) are performed considering the bit modification pixels (pixel data) of the temporal direction. In this case, it is needed to form a block in like manner at also the time of learning. Besides, a block (a class tap and a predictive tap) can be composed of only thinned pixels that are located in the temporal direction of the attentional bit modification pixel x.

In this third embodiment, in the case where the attention has been paid to a certain attentional bit-modification pixel, the bit modification pixels that are used for clustering and the bit modification pixels that are used for calculating the linear expression shown in the equation (3) are identical; however, these are not always required to be identical. That is, it is able to use the distinct sets of thinned pixels, for clustering and for calculation of the equation (3). Besides, the method for clipping a class tap or a predictive tap may be changed adaptively, in accordance with the spatial feature (activity), movement, and others of the image.

Besides, bit modification pixels that are used for clustering and bit modification pixels that are used for calculating the linear expression shown in the equation (3) are not always required to neighbor the attentional bit modification pixel spatially or temporally. But, it is desirable to use the bit modification pixels that are resting on the periphery of the attentional bit modification pixel.

Besides, ADRC processing has been used in the clustering circuit, and the class has been determined on the basis of the spatial activity; however, the movement of the block that has been detected may be used as the class, or the class may be determined based on the combination of ADRC processing and movement detection.

In this embodiment, each pixel of the respective frames that compose a dynamic image was 12 bits, however, we do not intend to limit the present invention to such; each pixel may be comprised of the different number of bits, such as 8 bits, 10 bits and 16 bits.

In this embodiment, the attentional bit modification pixel x' (pixel data) is not included in the class tap or the predictive tap, however, we do not intend to limit the present invention to such; the attentional bit modification pixel (pixel data) may be included in the class tap or the predictive tap. In this case, at also the time when the predictive data is produced for each class, it is needed that the class tap and the predictive tap include the attentional bit modification pixel (pixel data) similarly.

Modifications of the succeeding circuits (the blocking circuit 11, the clustering circuit 12, the memory 13, the interpolation data producing circuit 14 and the synthesis circuit 10) for processing the image data that is delivered from the image memory 56 are similar to those of the first embodiment, so the description is omitted.

The transmitting/receiving system to which the invention has been applied has been described hereinbefore; such a transmitting/receiving system can be used in the case of recording/reproducing of image, as well as television broadcasting.

According to the image processing apparatus and the image processing method of the present invention, the pixels of the respective frames that compose the dynamic image are thinned in such a manner that they become the chessboard-like lattice pattern in both directions of the spatial direction and the temporal direction. Besides, according to the transmission medium and the transmitting method of the present invention, the data that is obtained by thinning the pixels of the respective frames that compose the dynamic image such that they become the chessboard-like lattice pattern in both directions of the spatial direction and the temporal direction is transmitted. Therefore, it is able to reduce the quantity of information, maintaining the resolution of the dynamic image of horizontal, vertical and oblique directions.

Besides, according to the image processing apparatus and the image processing method of the present invention, the original image is produced from the thinned pixels that is obtained by thinning the pixels of the respective frames composing the dynamic image in such a manner that they become the chessboard-like lattice pattern in both directions of the spatial direction and the temporal direction. Therefore, it is able to obtain the image whose deterioration of image quality is little.

Besides, according to the image processing apparatus and the image processing method of the present invention, the pixels of the respective frames that compose the dynamic image are thinned in such a manner that they become the chessboard-like lattice pattern in both directions of the spatial direction and the temporal direction, and, in addition, the bits of each pixel of the thinned pixel are subjected to bit-thinning. Besides, according to the transmission medium and the transmitting method of the present invention, the data is transmitted wherein said data is obtained by thinning the pixels of the respective frames that compose the dynamic image such that they become the chessboard-like lattice pattern in both directions of the spatial direction and the temporal direction and, in addition, exposing the bits of each pixel of the thinned pixels to bit-thinning. Therefore, it is able to reduce the quantity of information, maintaining the resolution of the dynamic image of horizontal, vertical and oblique directions.

Besides, according to the image processing apparatus and the image processing method of the present invention, the original image is produced from the thinned pixels that are obtained by thinning the pixels of the respective frames composing the dynamic image in such a manner that they become the chessboard-like lattice pattern in both directions of the spatial direction and the temporal direction and, in addition, exposing the bits of each pixel of the thinned pixels to bit-thinning. Therefore, it is able to obtain the image whose deterioration of image quality is little.

INDUSTRIAL APPLICABILITY

A new image format is provided in which deterioration of image quality is little of the time when digital image data is transmitted and then the digital image data is restored.

What is claimed is:

1. An image processing apparatus for processing a thinned data that has been produced by thinning the pixels of the image data that composes a dynamic image, said image processing apparatus comprises:

receiving means for receiving a thinned image data that has been produced by thinning the pixels of the respective frames that compose a dynamic image, in such a manner that they become the cheeseboard-like lattice format in both directions of the spatial direction and the temporal direction; and restoring means for producing the negated pixels, with respect to said thinned image data, and restoring the original image data;

said restoring means comprising:

determining means for determining a stated class that represents the property of the attentional negated pixel of said thinned image data; and generating means for predicting the original pixel in response to said determined class, and for generating the original pixel data.

2. The image processing apparatus as claimed in claim 1, in which said generating means includes a memory for storing a predictive data, for each class, that has been previously produced for each class on the basis of learning by the use of the image data that composes a dynamic image in a standard manner, reads out a predictive data that corresponds to said determined class, and generates the original pixel data on the basis of the predictive data that has been read out.

3. The image processing apparatus as claimed in claim 2, in which said memory stores a set of predictive data for each class as said predictive data; and said generating means reads out a predictive coefficient set that corresponds to said determined class, and generates the original pixel data on the basis of the read predictive set and the plural bit-thinned pixels that are located at the periphery of said attentional bit-thinned pixel.

4. The image processing apparatus as claimed in claim 2, in which said memory stores a pixel value for each class as said predictive data; and said generating means reads out a pixel value that corresponds to said determined class, and outputs the pixel value as the original pixel data.

5. The image processing apparatus as claimed in claim 1, in which said determining means determines a class with respect to said attentional bit-thinned pixel, using the bit-thinned pixels that have been located in the spatial and/or temporal directions.

6. An image processing apparatus for processing a thinned data that has been produced by thinning the pixels of the image data that composes a dynamic image, said image processing apparatus comprises:

receiving means for receiving a modified thinned image data that has been obtained by further performing bit-thinning of the direction of the level of the pixel, with respect to each pixel of the thinned image data that has been produced by thinning the pixels of the respective frames that compose a dynamic image, in such a manner that they become the cheeseboard-like lattice format in both directions of the spatial direction and the temporal direction; and a restoring means for producing the original pixel with respect to each bit-thinned pixel of said modified thinned image data, thereby producing the thinned image data, and for restoring the original image data from the thinned pixels of said thinned image data;

said storing means comprising:

first determining means for determining a stated class that represents the property of an attentional bit-thinned pixel of said bit-thinned image data;

first generating means for predicting the original pixel in response to said determined class, thereby generating the original pixel data;

second determining means for determining a stated class that represents the property of the attentional negated pixel of the thinned image data that is composed of said pixel data which has been generated by said first generating means; and second generating means for predicting the original pixel in response to said determined class, and for generating the original pixel data.

7. The image processing apparatus as claimed in claim 6, in which said first generating means includes a memory for storing a predictive data, for each class, that has been previously produced for each class on the basis of learning by the use of the image data that composes a dynamic image in a standard manner, reads out the predictive data that corresponds to the class that has been determined by said first determining means, and generates the original pixel data on the basis of the very predictive data that has been read out; and each of said second generating means includes a memory for storing a predictive data, for each class, that has been previously produced for each class on the basis of learning by the use of the image data that composes a dynamic image in a standard manner, reads out the predictive data that corresponds to the class that has been determined by said second determining means, and generates the original pixel data on the basis of the very predictive data that has been read out.

8. The image processing apparatus as claimed in claim 7, in which the memory of said first generating means stores a predictive coefficient set for each class as said predictive data;

said first generating means reads out a predictive coefficient set that corresponds to said determined class, and generates the original pixel data on the basis of the read predictive set and the plural bit-thinned pixels that are located at the periphery of said attentional bit-thinned pixel;

the memory of said second generating means stores a predictive coefficient set for each class as said predictive data; and said second generating means reads out a predictive coefficient set that corresponds to said determined class, and generates the original pixel data on the basis of the read predictive set and the plural bit-thinned pixels that are located at the periphery of said attentional negated pixel.

9. The image processing apparatus as claimed in claim 7, in which the memory of said first generating means stores a pixel value for each class as said predictive data;

said first generating means reads out a pixel value that corresponds to said determined class, and outputs the pixel value as the original pixel data;

the memory of said second generating means stores a pixel value for each class as said predictive data; and said second generating means reads out a pixel value that corresponds to said determined class, and outputs the pixel value as the original pixel data.

10. The image processing apparatus as claimed in claim 6, in which said first determining means determines a class with respect to said attentional bit-thinned pixel, using the bit-thinned pixels that have been located in the spatial and/or temporal directions; and said second determining means determines a class with respect to said attentional negated pixel, using the bit-thinned pixels that have been located in the spatial and/or temporal directions.

* * * * *